(12) United States Patent
     Sakamoto et al.

(10) Patent No.: US 8,773,623 B2
(45) Date of Patent: Jul. 8, 2014

(54) TRANSFLECTIVE LIQUID CRYSTAL DISPLAY DEVICE INCLUDING TRANSMISSIVE AND REFLECTIVE AREAS IN EACH PIXEL

(71) Applicant: NLT Technologies, Ltd., Kanagawa (JP)

(72) Inventors: Michiaki Sakamoto, Kawasaki (JP); Jin Matsushima, Kawasaki (JP); Hiroshi Nagai, Kawasaki (JP); Kenichi Mori, Kawasaki (JP); Hidenori Ikeno, Kawasaki (JP); Yasuki Kudo, Kawasaki (JP); Ken Sumiyoshi, Kawasaki (JP)

(73) Assignee: NLT Technologies, Ltd. (JP)

( * ) Notice: Subject to any disclaimer, the term of this patent is extended or adjusted under 35 U.S.C. 154(b) by 0 days.

(21) Appl. No.: 13/834,011

(22) Filed: Mar. 15, 2013

(65) Prior Publication Data

US 2013/0208217 A1    Aug. 15, 2013

Related U.S. Application Data

(62) Division of application No. 12/725,339, filed on Mar. 16, 2010, now Pat. No. 8,436,967, which is a division of application No. 11/427,753, filed on Jun. 29, 2006, now Pat. No. 7,705,937.

(30) Foreign Application Priority Data

Jun. 30, 2005   (JP) .................................. 2005-191061

(51) Int. Cl.
     *G02F 1/1335*   (2006.01)
     *G02F 1/1343*   (2006.01)

(52) U.S. Cl.
     USPC .............. 349/114; 349/96; 349/103; 349/141

(58) Field of Classification Search
     CPC .......... G02F 1/133555; G02F 2203/09; G02F 1/133553; G02F 2001/134318
     USPC .................................... 349/114, 141, 96, 103
     See application file for complete search history.

(56) References Cited

U.S. PATENT DOCUMENTS

| 5,568,163 A | 10/1996 | Okumura ...................... 345/100 |
| 6,914,656 B2 | 7/2005 | Sakamoto et al. ............ 349/141 |

(Continued)

FOREIGN PATENT DOCUMENTS

| CN | 1459774 | 12/2003 | ............... G09G 3/36 |
| CN | 1567038 | 1/2005 | ............ G02F 1/1333 |

(Continued)

OTHER PUBLICATIONS

Chinese Official Action dated Jan. 20, 2011 (7 pages).

(Continued)

*Primary Examiner* — Huyen Ngo
(74) *Attorney, Agent, or Firm* — Hayes Soloway P.C.

(57) ABSTRACT

An IPS-mode transflective LCD device includes an array of pixels each including a reflective region and a transmissive region. A first pixel electrode and a first common electrode are formed in the reflective region, and a second pixel electrode and a second common electrode are formed in the transmissive region. The first and second pixel electrodes receive a common pixel signal. The first common electrode receives a first common signal which is common among the reflective regions of a plurality of pixels, and the second common electrode receives a second common signal which is common among the transmissive regions of the plurality of pixels.

6 Claims, 34 Drawing Sheets

(56) References Cited

U.S. PATENT DOCUMENTS

| | | | |
|---|---|---|---|
| 7,084,942 B2 | 8/2006 | Luo | 349/114 |
| 7,414,684 B2 | 8/2008 | Jang et al. | 349/114 |
| 2002/0117347 A1 | 8/2002 | Nishizaki et al. | 180/403 |
| 2002/0196221 A1 | 12/2002 | Morita | 345/87 |
| 2003/0117347 A1 | 6/2003 | Hunter et al. | 345/76 |
| 2004/0008300 A1 | 1/2004 | Maeda et al. | 349/114 |
| 2005/0122453 A1 | 6/2005 | Jang et al. | 349/114 |
| 2005/0237831 A1 | 10/2005 | Ishii | 365/201 |
| 2007/0211198 A1 | 9/2007 | Nagai et al. | 349/114 |
| 2008/0218670 A1 | 9/2008 | Kumai | 349/114 |
| 2010/0123862 A1 | 5/2010 | Hsu et al. | 349/114 |

FOREIGN PATENT DOCUMENTS

| | | | |
|---|---|---|---|
| JP | 2003344837 | 3/2003 | G02F 1/1335 |
| JP | 2005-003962 | 6/2005 | G02F 1/1343 |
| TW | 200403505 | 1/2004 | G02F 1/13 |

OTHER PUBLICATIONS

Taiwanese Official Action and translation dated Apr. 29, 2011 (10 pages).

Japanese Official Action and translation dated Nov. 8, 2011 issued in counterpart Japanese Patent Application No. 2006-180200 (3 pgs).

Chinese Office Action (with translation), issued in corresponding application No. 201110154059.2, dated Dec. 29, 2011 (9 pgs).

REFLECTION

 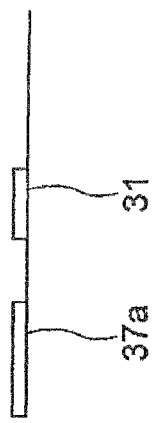 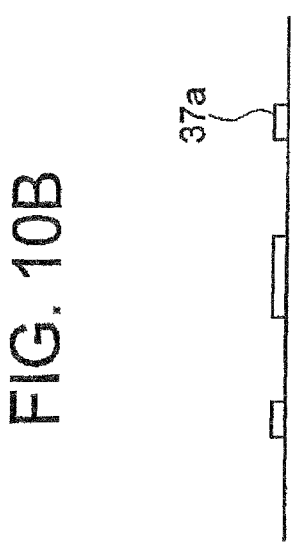 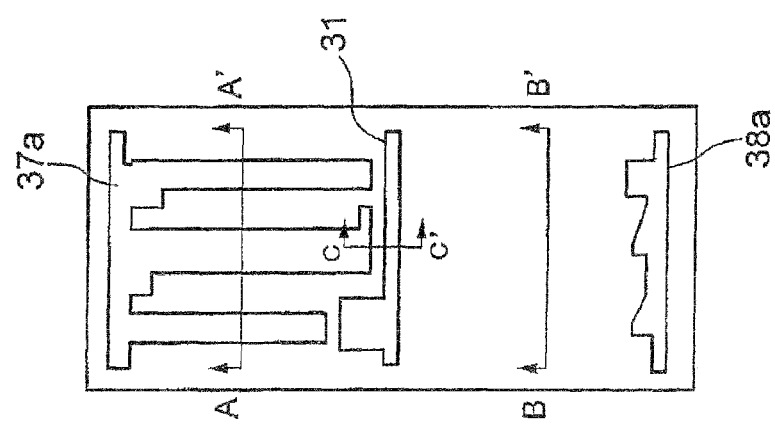

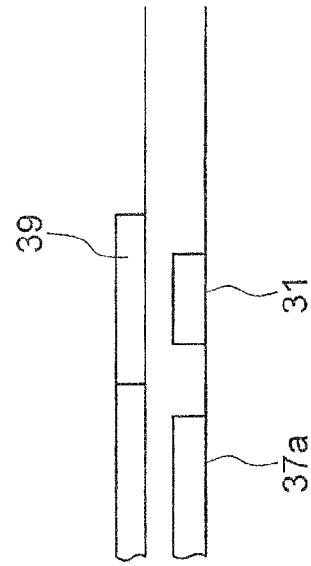
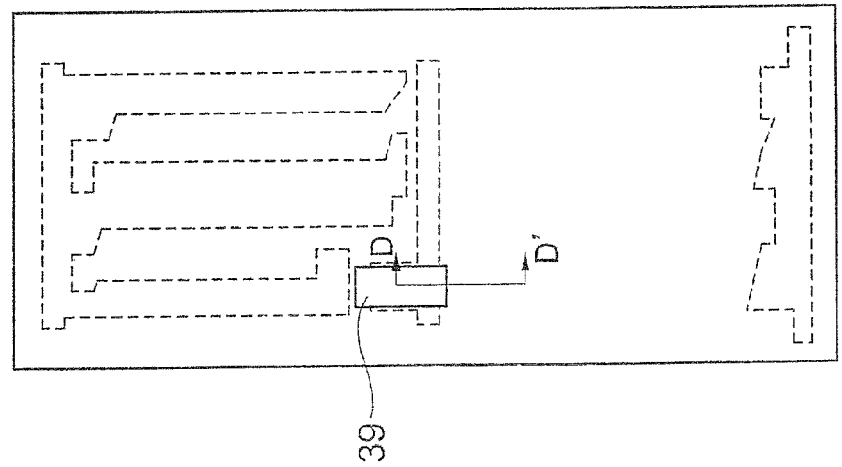

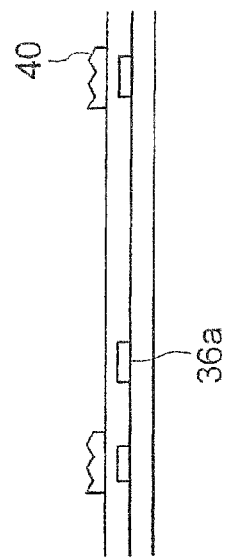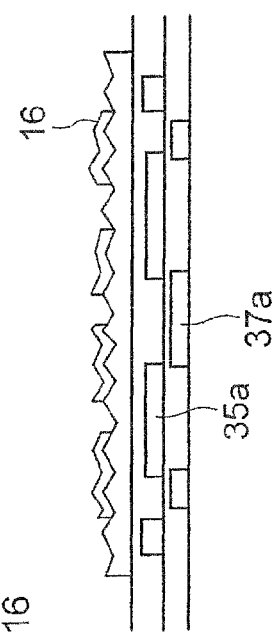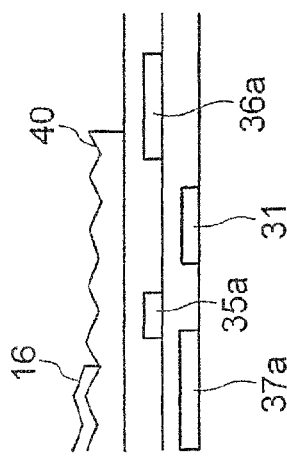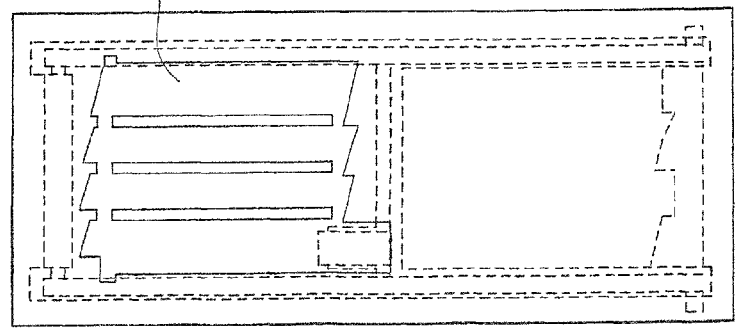

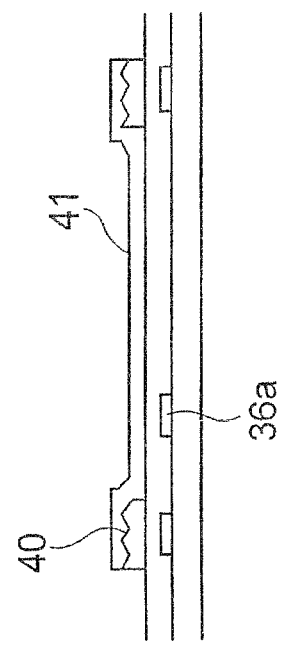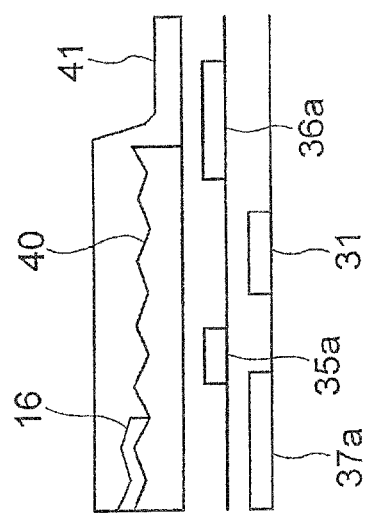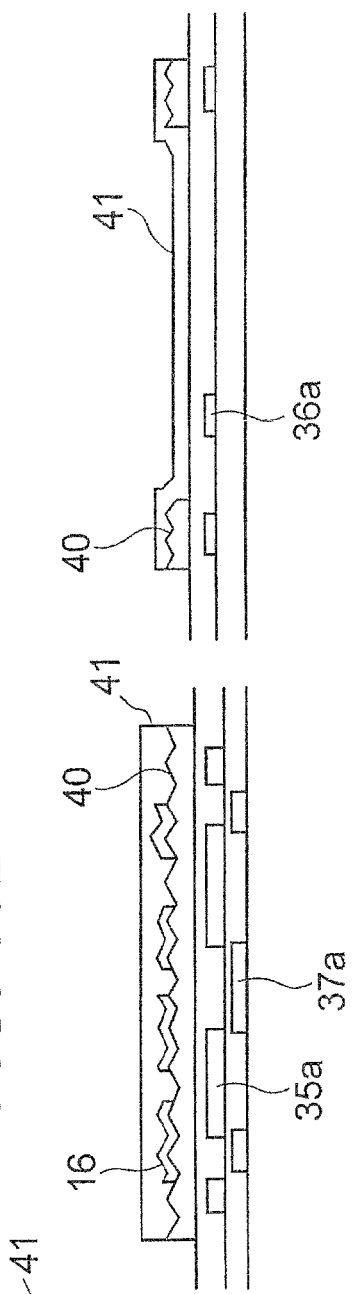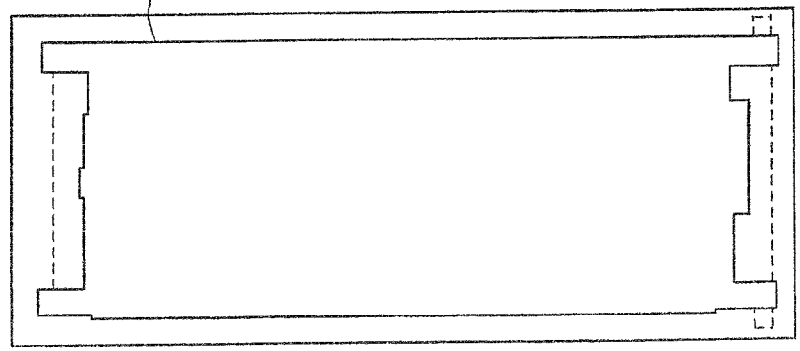

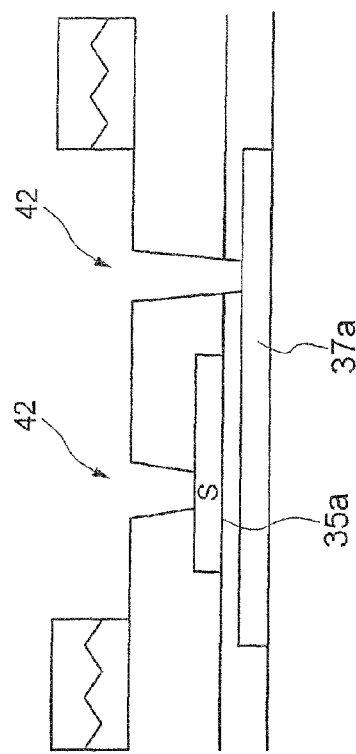
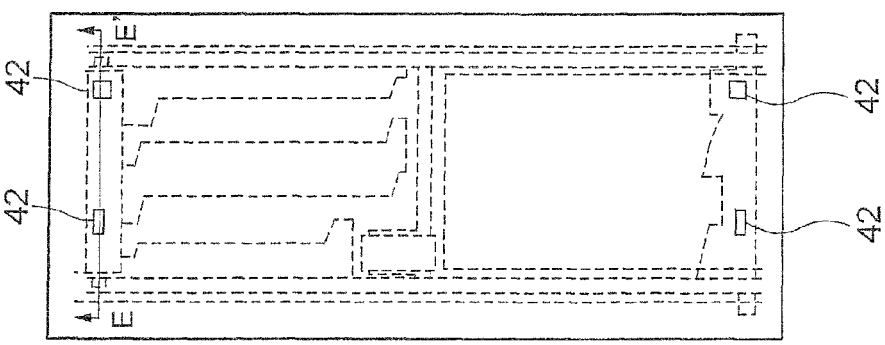

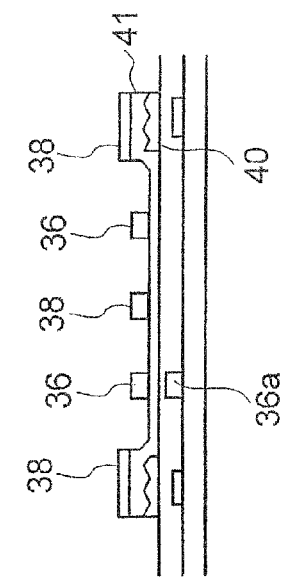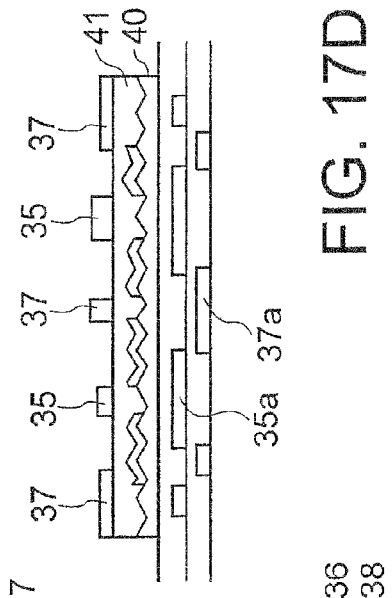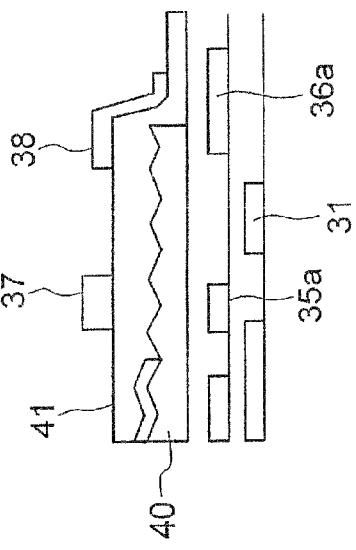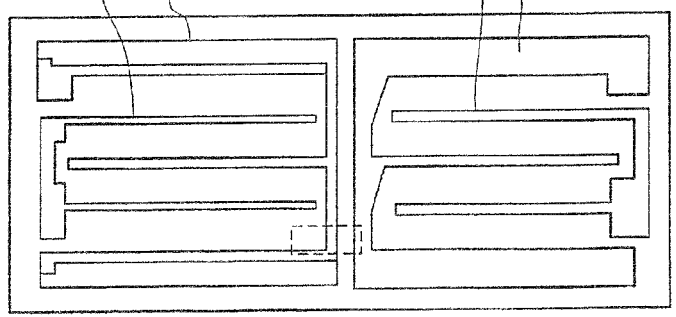

FIG. 25

|  | No.1 | No.2 | No.3 | No.4 | No.5 | No.6 | No.7 | No.8 |
|---|---|---|---|---|---|---|---|---|
| POLARIZING FILM 11 | 45 | 135 | 45 | 45 | 45 | 135 | 45 | 135 |
| λ/2 WAVELENGTH FILE 18 | 112.5 | 67.5 | 67.5 | 112.5 | 22.5 | 157.5 | 157.5 | 22.5 |
| LC LAYER 13 | 90 | 90 | 90 | 90 | 90 | 90 | 90 | 90 |
| λ/2 WAVELENGTH FILE 19 | 112.5 | 112.5 | 67.5 | 67.5 | 22.5 | 22.5 | 157.5 | 157.5 |
| POLARIZING FILM 15 | 135 | 135 | 135 | 135 | 135 | 135 | 135 | 135 |

US 8,773,623 B2

TRANSFLECTIVE LIQUID CRYSTAL DISPLAY DEVICE INCLUDING TRANSMISSIVE AND REFLECTIVE AREAS IN EACH PIXEL

CROSS REFERENCE TO RELATED APPLICATION

This application is a divisional of U.S. application Ser. No. 12/725,339, filed Mar. 16, 2010, which in turn is a divisional of U.S. application Ser. No. 11/427,753, filed Jun. 29, 2006, now U.S. Pat. No. 7,705,937, granted Apr. 27, 2010, the contents of which are incorporated herein by reference.

BACKGROUND OF THE INVENTION (a) Field of the Invention

The present invention relates to a transflective liquid crystal display (LCD) device including a transmissive area and a reflective area in each pixel of the LCD device.

(b) Description of the Related Art

LCD devices are generally categorized in two types: a transmissive LCD device having therein a backlight unit as a light source; and a reflective LCD device having therein a reflection film which reflects external light incident onto the LCD device and thus functions as a light source. The reflective LCD device has the advantages of lower power dissipation, smaller thickness and lighter weight compared to the transmissive LCD device, due to absence of a backlight source in the reflective LCD device. On the other hand, the transmissive LCD device is superior to the reflective LCD device in that the transmissive LCD device can be well observed in a dark environment.

There is another type of the LCD device, known as a transflective LCD device, which has the advantages of both the reflective and transmissive LCD devices. Such a transflective LCD device is described in Patent Publication JP-A-2003-344837A, for example. The transflective LCD device includes a transmissive region (or transparent region), and a reflection region in each pixel of the LCD device. The transmissive region passes light emitted from a backlight source, and uses the backlight source as a light source. The reflective region includes a rear reflective plate or reflection film, and uses external light reflected by the reflection film as a light source.

In the transflective LCD device, the image display is performed by the reflective region in a well-lighted environment, with the backlight source being turned OFF, thereby achieving a smaller power dissipation. On the other hand, the image display is performed by the transmissive region in a dark environment, with the backlight source being turned ON, thereby achieving an effective image display in the dark environment.

In general, a variety of modes are used for operating LCD devices, including an in-plane-switching (IPS) mode, a twisted-nematic (TN) mode, and a fringe-field-switching (FFS) mode. Each pixel of the IPS-mode or FFS-mode LCD device includes a pixel electrode and a common electrode which are disposed on a common substrate to apply the liquid crystal (LC) layer with a lateral electric field. The IPS-mode or FFS-mode LCD device using a lateral electric field rotates the LC molecules in a plane parallel to the substrate to perform the image display, and achieves a higher viewing angle compared to the TN-mode LCD device.

If the IPS mode or FFS mode using a lateral electric field is to be employed in the transflective LCD device as described above, there arises an image-inversion problem in the LCD device, as described in the patent publication as mentioned above. More specifically, in a normal driving technique of the LCD device, if the transmissive region operates in a normally-black mode wherein absence of the applied voltage corresponds to a dark state, the reflective region operates in a normally-white mode wherein absence of the applied voltage corresponds to a bright state. The reason of the image-inversion problem will be described in detail hereinafter.

FIG. 34A schematically shows a pixel of a transflective LCD device, which includes therein a reflective region 55 and a transmissive region 56. The transmissive region 56 is configured by a first polarizing film 51, a first substrate (counter substrate) 61, a LC layer 53 having a retardation of $\lambda/2$, a second substrate (TFT substrate) 62, and a second polarizing film 52, which are arranged in this order as viewed from the front of the LCD device 50, wherein $\lambda$ is a wavelength of the light. The reflective region 55 is configured by the first polarizing film 51, first substrate 61, LC layer 53 having a retardation of $\lambda/4$, an insulation film 63, and a reflection film 54, effective constituent elements. In FIG. 34A, polarizing axis of the polarizing films 51, 52, longer axis of the LC molecules in the LC layer 53 are depicted in the state wherein the LCD device is rotated by 90 degrees along a plane normal to the sheet of the drawing in the counterclockwise direction as viewed from the left of the drawing.

FIG. 34B shows polarization of light in the respective regions 55, 56 in FIG. 34A for the case of presence (Von) and absence (Voff) of the applied voltage, in the portions wherein the light passes through the first polarizing film 51, LC layer 53 and second polarizing film 52. In FIG. 34B, an arrow means linearly-polarized light, "L" encircled by a circle means counterclockwise-circularly-polarized light, "R" encircled by a circle means clockwise-circularly-polarized light, blank elongate bar means the director of the LC, i.e., longer axis of the LC molecules. FIG. 35 shows a sectional view of this type of the practical LCD device, the principle of which is shown in FIGS. 34A and 34B, including a backlight source 57.

In the LCD device 50a shown in FIG. 35, the reflective region 55 uses the reflection film 54 as the light source, whereas the transmissive region 56 uses the backlight source 57 as the light source.

The first polarizing film 51 disposed at the front side of the LC layer 53 and the second polarizing film 52 disposed at the rear side thereof have respective polarizing axes, which are perpendicular to one another. The LC layer 53 includes LC molecules having a director which is 90 degrees deviated from the polarizing axis of the second polarizing film 52 upon absence of the applied voltage. Assuming that the polarizing axis of the second polarizing film 52 is directed at a reference direction (zero degree), for example, the polarizing axis of the first polarizing film 51 is directed at 90 degrees and the longer axis of the LC molecules in the LC layer 53 is also directed at 90 degrees. The zero-degree direction is shown as the lateral direction in FIG. 34B, and the 90-degree direction is shown as the vertical direction in FIG. 34B. The cell gap of the LC layer 53 in the transmissive region 56 is adjusted such that the retardation $\Delta$nd is equal to $\lambda/2$, whereas the cell gap of the LC layer 53 in the reflective region 55 is adjusted such that the retardation $\Delta$nd is equal to $\lambda/4$, given $\lambda$, $\Delta$n and d being wavelength of the light, refractive-index anisotropy and cell gap, respectively. As for $\lambda$, if the wavelength of green light is used as a reference, $\lambda$ is 550 nm.

Operation of the LCD device shown in FIGS. 34A, 34B and 35 will be described hereinafter, for each case of absence and presence of the applied voltage in respective regions 55, 56.

(1) Reflective Region Upon Absence of Applied Voltage:

In the left column (Voff) of the reflective region 55 shown in FIG. 34B, a linearly-polarized light polarized at 90 degrees, i.e., 90-degree linearly-polarized light is incident onto the LC layer 53 after passing through the first polarizing film 51. Since the optical axis of the linearly-polarized light incident onto the LC layer 53 is aligned with the longer axis of the LC molecules, the 90-degree linearly-polarized light passes through the LC layer 53 as it is, and is then reflected by the reflection film 54. The linearly-polarized light does not change the state thereof in general after the reflection, as shown in FIG. 34B, and is again incident onto the LC layer 53 as the 90-degree linearly-polarized light. The 90-degree linearly-polarized light passes through the LC layer 53 as it is and is incident onto the first polarizing film 51, which has a polarizing axis at 90 degrees, passes the 90-degree linearly-polarized light as it is. Thus, absence of the applied voltage allows the reflective region to assume a bright state.

(2) Reflective Region Upon Presence of Applied Voltage:

In the right column (Von) of the reflective region 56 in FIG. 34B, the 90-degree linearly-polarized light passed by the first polarizing film 51 is incident onto the LC layer 53. The voltage applied to the LC layer 53 directs the longer axis of the LC molecules from zero degree to 45 degrees within the plane parallel to the substrates. The deviation of polarized direction of the incident linearly-polarized light from the longer axis of the LC molecules in the LC layer 53 by 45 degrees and the retardation of λ/4 change the 90-degree linearly-polarized light into a clockwise-circularly-polarized light after the reflection, which is incident onto the reflection film 54 and reflected thereby. The reflected light shifts to a counterclockwise-circularly-polarized light and is incident onto the LC layer 53. The counterclockwise-linearly-polarized light is changed by the LC layer 53 into a zero-degree linearly-polarized light and incident onto the first polarizing film 51. The polarizing film 51 having a polarizing axis at 90 degrees blocks the incident light, thereby representing dark state.

Thus, the reflective region 55 operates in a normally-white mode wherein absence of the applied voltage provides a bright state, whereas presence of the applied voltage provides a dark state.

(3) Transmissive Region Upon Absence of Applied Voltage:

In the left column of the transmissive region 56 shown in FIG. 34B, a zero-degree linearly-polarized light is passed by the second polarizing film 52 and incident onto the LC layer 53. Since this incident light has a polarized direction normal to the longer axis of the LC molecules in the LC layer 53, the incident light is passed by the LC layer 53 as it is, and is incident onto the first polarizing film 51 as the zero-degree linearly-polarized light. The first polarizing film 51 having a polarizing axis at 90 degrees blocks the incident light, thereby representing a dark state.

(4) Transmissive Region Upon Presence of Applied Voltage:

In the right column of the transmissive region 56 shown in FIG. 34B, a zero-degree linearly-polarized light is passed by the second polarizing film 52 and incident onto the LC layer 53. The voltage applied to the LC layer 53 directs the longer axis of the LC molecules from zero degree to 45 degrees within the plane parallel to the substrates. The deviation of polarized direction of the incident linearly-polarized light from the longer axis of the LC molecules in the LC layer 53 by 45 degrees and the retardation of λ/2 of the LC layer change the zero-degree linearly-polarized light into a 90-degree linearly-polarized light, which is incident onto the first polarizing film 51. The first polarizing film 51 having a polarizing axis at 90 degrees passes the incident light, thereby representing a bright state.

Thus, the transmissive region operates in a normally-black mode wherein absence of the applied voltage provides a dark state whereas presence of the applied voltage provides a bright state.

The image-inversion problem is a general problem common to the lateral-electric-field modes (IPS mode, FFS mode) and other LCD modes. However, as to the TN mode, horizontal-orientation mode (ECB mode) or vertical-alignment mode (VA mode), for example, the image-inversion problem may be solved using a circularly-polarized light as the incident light to the LC layer. For this purpose, the orientations of the first polarizing film and λ/4 wavelength film are deviated by 45 degrees from one another. However, if the incident light is a circularly-polarized light, the circularly-polarized light looses the sensitivity to the rotation of the LC molecules parallel to the substrates, and thus passes through the LC layer as the circularly-polarized light. Accordingly, the LCD device using the lateral electric field represents a dark state at any time irrespective of presence or absence of the applied voltage in either of the reflective mode and the transmissive mode. That is, the lateral-electric-field-mode LCD device cannot represent the image thereof by using such a λ/4 wavelength film.

As described above, the transflective LCD device has the problem that both the absence and presence of the applied voltage provide reversed images of bright state and dark state in each pixel. The patent publication as mentioned above solves this problem without using the λ/4 wavelength film, by using the arrangement shown in FIG. 35, wherein the polarizing axis of the first polarizing film 51 is 45 degrees deviated from the longer axis of the LC molecules in the LC layer 53, as shown on the left side of the drawing. In this case, the reflective region 55 operates in a normally-black mode, whereas the transmissive region 56 operates in a normally-white mode. In order for changing the transmissive region 56 to operate in a normally-black mode, a λ/2 wavelength film 58 is interposed between the second polarizing film 52 and the LC layer 53, the λ/2 wavelength film 58 having an optical axis at 135 degrees, which is perpendicular to the longer axis of the LC molecules in the LC layer 53.

By using the above configuration, in the front viewing angle, the λ/2 wavelength film 58 compensates the polarizing effect on the light by the LC layer 53 having a retardation at λ/2. Thus, the combination of the LC layer 53 and λ/2 wavelength film 58 provides a substantially similar polarized state for both the incident light and the reflected light. Accordingly, the light passed by the second polarizing film 52 and assuming a 90-degree linearly-polarized state remains in the same polarized state after passing through the λ/2 wavelength film 58 and LC layer 53, and thus cannot pass through the first polarizing film 51. In short, the λ/2 wavelength film 58 interposed between the LC layer 53 and the second polarizing film 56 allows the transmissive region 56 to operate in a normally-white mode.

In the LCD device 50a shown in FIG. 35, the polarized direction of the light incident onto the LC layer 53 is deviated from the parallel or normal direction of the longer axis of the LC molecules in the LC layer 53. This involves a significant leakage of light during display of a dark state, due to the wavelength dispersion characteristic of the retardation of the LC layer 53. In addition, the λ/2 wavelength film 58 itself has a wavelength dispersion characteristic, which also causes leakage light during display of a dark state.

It is to be noted that the image-inversion problem, wherein the transmissive region 56 and the reflective region operate in reverse normal modes, can be solved by inverting the polarity of the applied voltage between the transmissive region 56 and the reflective region 55. The inversion of the voltage polarity as used herein is such that absence of the applied voltage in the transmissive region 56 and presence of the applied voltage in the reflective region 55 are concurrently performed. However, this configuration is not known in the field of LCD devices. In addition, the problem encountered in such a configuration and the technique for solving the problem are also not known.

SUMMARY OF THE INVENTION

It is an object of the present invention to provide a transflective LCD device which is capable of solving the image-inversion problem encountered in the conventional transflective LCD device due to, for example, the normally-white mode of the transmissive region and the normally-black mode of the reflective region, by providing different voltages to the LC layer in the reflective region and the transmissive region.

It is another object of the present invention to provide a method for driving a transflective LCD device having a reflective region and a transmissive region in each of the pixels.

The present invention provides in a first aspect thereof a liquid crystal display (LCD) device including first and second polarizing films having polarizing axes perpendicular to one another, a liquid crystal (LC) layer interposed between the first polarizing film and the second polarizing film, the LC layer defining an array of pixels each including a reflective region and a transmissive region juxtaposed, the pixels being driven by a lateral electric field, wherein:

LC molecules of the LC layer have a longer axis extending parallel to or normal to light incident onto the LC layer in the reflective region; and each of the pixels includes a pixel electrode receiving a pixel signal which is common between the reflective region and the transmissive region, a first common electrode receiving a first common signal which is common among the reflective regions of a plurality of the pixels, and a second common electrode receiving a second common signal which is common among the transmissive regions of the plurality of the pixels.

The present invention provides, in a second aspect thereof, a transflective liquid crystal display (LCD) device including: a liquid crystal (LC) layer defining an array of pixels arranged in a matrix, each of the pixels including therein a reflective region and a transmissive region juxtaposed, wherein:

each of the pixels includes a first pixel electrode in the reflective region, and a second pixel electrode in the transmissive region; and each of the pixels is associated with a first switching device for coupling together the first electrode and a data line supplying a data signal, and a second switching device for coupling together the second electrode and the data line.

The present invention provides, in a third aspect thereof, a method for driving a transflective liquid crystal display device (LCD) including a reflective region and a transmissive region in each of pixels arranged in an array, said method comprising the steps of:

generating a first data signal and a second data signal having therebetween a specific potential relationship; and applying said first data signal and said second data signal to said reflective region and said transmissive region, respectively.

The above and other objects, features and advantages of the present invention will be more apparent from the following description, referring to the accompanying drawings.

BRIEF DESCRIPTION OF THE DRAWINGS

FIG. 10A is a top plan view of a TFT substrate in a step of fabrication process thereof, and FIGS. 10B to 10D are sectional views taken along lines A-A', B-B' and C-C', respectively, in FIG. 10A.

FIG. 11A is a top plan view of the TFT substrate in a step subsequent to the step shown in FIG. 10A, and FIG. 11B is a sectional view taken along line D-D' in FIG. 11A.

FIG. 14A is a top plan view of the TFT substrate in a step subsequent to the step shown in FIG. 13A, and FIGS. 14B to 14D are sectional views taken along lines corresponding to lines A-A', B-B' and C-C', respectively, in FIG. 10A.

FIG. 15A is a top plan view of the TFT substrate in a step subsequent to the step shown in FIG. 14A, and FIGS. 15B to 15D are sectional views taken along lines corresponding to lines A-A', B-B' and C-C', respectively, in FIG. 10A.

FIG. 16A is a top plan view of the TFT substrate in a step subsequent to the step shown in FIG. 15A, and FIG. 16B is a sectional view taken along line E-E' in FIG. 16A.

FIG. 17A is a top plan view of the TFT substrate in a step subsequent to the step shown in FIG. 16A, and FIGS. 17B to 17D are sectional views taken along lines corresponding to lines A-A', B-B' and C-C', respectively, in FIG. 10A.

FIG. 25 is a table tabulating the angle combination for the optical transmission axis of the polarizing films, longer axis of the LC molecules, and optical axis of the λ/2 wavelength films.

PREFERRED EMBODIMENT OF THE INVENTION

Figure 1:
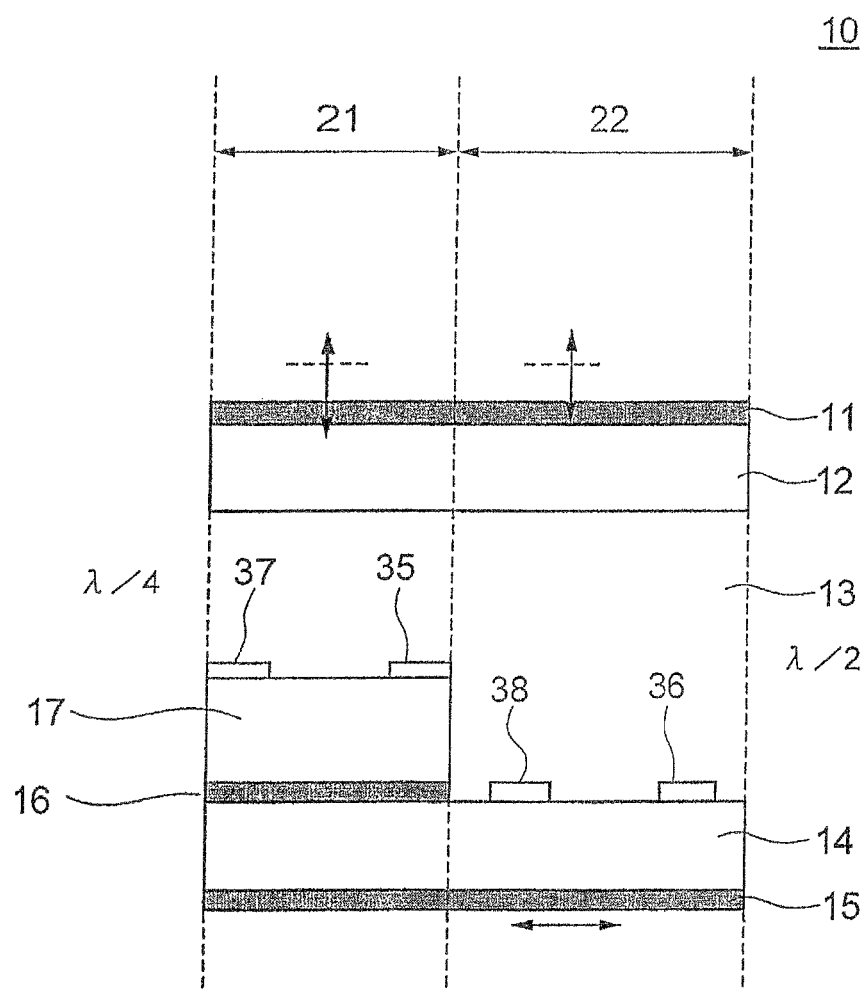
FIG. 1 is a schematic sectional view of a pixel in a transflective LCD device according to a first embodiment of the present invention.

Now, the present invention is more specifically described with reference to accompanying drawings, wherein similar constituent elements are designated by similar reference numerals.

Figure 2:
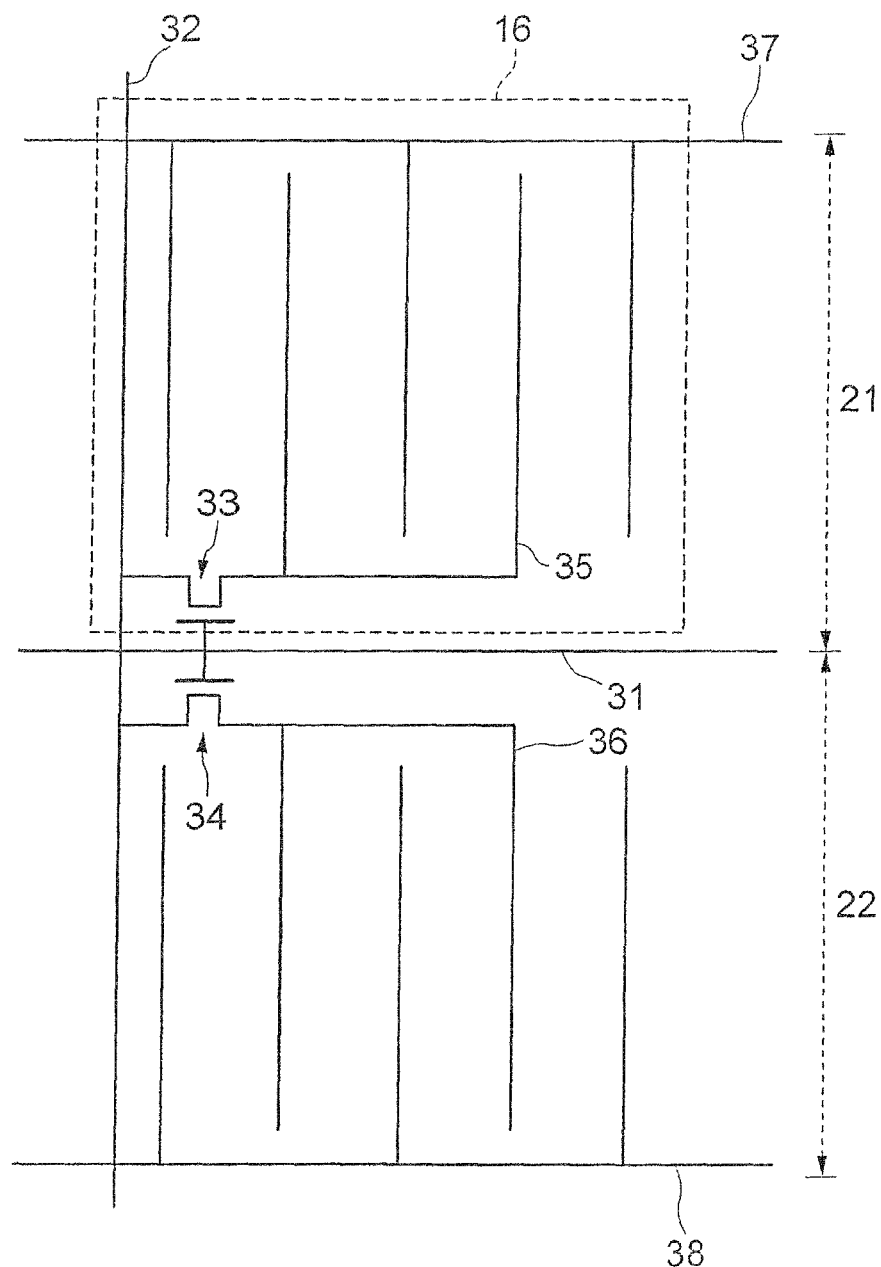
FIG. 2 is a schematic top plan view of the pixel shown in FIG. 1.

FIG. 1 is a sectional view schematically showing a pixel in a transflective LCD device according to a first embodiment of the present invention. FIG. 2 is a schematic top plan view of the TFT substrate in the pixel shown in FIG. 1. The LCD device, generally designated by numeral 10, includes a first polarizing film 11, counter substrate (first substrate) 12, a LC layer 13, a TFT substrate (second substrate) 14, and a second polarizing film 15, which are arranged in this order from the front side toward the rear side of the LCD device 10. The first polarizing film 11 has a optical transmission axis at 90 degrees, and thus an absorption axis at zero degree, whereas the second polarizing film 15 has an optical transmission axis at zero degree, and thus an absorption axis of 90 degrees. The LC layer 13 includes LC molecules having a longer axis at 90 degrees upon absence of the applied voltage, in this example.

Each pixel of the LCD device 10 includes a reflective region 21 and a transmissive region 22. The reflective region 21 includes therein a reflection film 16 and a transparent insulation film 17, which are consecutively formed on the TFT substrate 14. The reflection film 16 reflects light passed by the first polarizing film 11 toward the same. The reflection film 16 has a concave/convex (uneven) surface for achieving a higher dispersion of the reflected light. On the insulation film 17, there are provided a first pixel electrode 35 and a first common electrode 37 for driving the LC layer 13 in the lateral direction. On the transmissive region 22, there are also provided a second pixel electrode 36 and a second common electrode 38 on the TFT substrate 14 for driving the LC layer 13 in the lateral direction.

The reflective region 21 uses the light reflected by the reflection film 16 as a light source. The LCD device 10 includes a backlight source (not shown) at the rear side of the second polarizing film 15, which is used in the transmissive region 22 as a light source. In the transmissive region 22, the cell gap is adjusted such that the LC layer 13 has a retardation substantially equal to λ/2. The term "substantially" as used herein means that an actual retardation equal to (α+(λ/2)) provides an effective retardation of λ/2. This is because the rotation of the LC molecules is suppressed in the vicinity of the substrates 12, 14 upon application of a voltage, although the LC molecules in the central area of the cell gap rotates corresponding to the applied voltage. For example, if the LC layer 13 has a retardation of Δnd=300 nm, the effective retardation Δndeff upon application of a voltage is Δndeff=λ/2=550 nm/2=275 nm. On the other hand, in the reflective region 21, the cell gap is adjusted such that the effective retardation of the LC layer 13 upon application of a voltage assumes λ/4, by selecting an optimum thickness for the insulation film 17.

As shown in FIG. 2, the TFT substrate 14 mounts thereon a plurality of gate lines 31 extending in a row direction and a plurality of data lines 32 extending in a column direction of the TFT substrate 14. TFTs 33 and 34 are disposed corresponding to the reflective region 21 and the transmissive region 22, respectively, in the vicinity of each of the intersections between the gate lines 31 and the data lines 32. The TFTs 33, 34 each have a gate electrode connected to a common gate line 31, a source and a drain, one of which is connected to a common data line 32, and the other of which is connected to a corresponding pixel electrode 35 or 36.

The first and second common electrodes 37 and 38 correspond to the reflective region 21 and the transmissive region 22, respectively. Each common electrode 37, 38 in the pixel includes a bus line extending parallel to the gate line 31 and a plurality of branch lines extending toward the internal of the pixel area from the bus line. The first common electrode 37 opposes the first pixel electrode 35 in the reflective region 21, whereas the second common electrode 38 opposes the second pixel electrode 36 in the transmissive region 22. The first and second common electrodes 37, 38 are applied with respective driving signals corresponding to the reflective region 21 and transmissive region 22.

The first and second pixel electrodes 35, 36 are connected to respective TFTs 33, 34, which are connected to a common gate line 31 and a common data line 32 for receiving a common gate signal and a common data signal (pixel signal). Thus, both the pixel electrodes 35, 36 receive a common data signal at the same timing. In the reflective region 21, the orientation in the LC layer 13 is controlled by the lateral electric field caused by the potential difference between the pixel electrode 35 and the common electrode 37, whereas in the transmissive region 22, the orientation in the LC layer 13 is controlled by the lateral electric field caused by the potential difference between the pixel electrode 36 and the common electrode 38. The reason for providing separate pixel electrodes 35 and 36 and separate TFTs 33 and 34 in respective regions 21, 22 of the pixel, irrespective of writing the same data signal into the pixel electrodes 35 and 36, is that the transient potential is different between the pixel electrodes 35 and 36 after turn-off of the TFTs 33, 34, which will be detailed later.

Figure 3A:
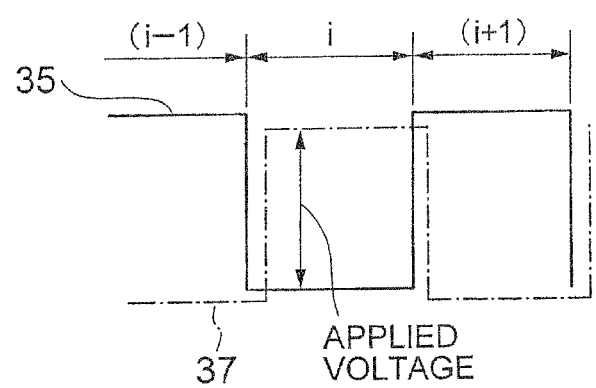
FIG. 3A is a waveform diagram of a driving signal applied in the reflective region of the pixel of FIG. 1.
Figure 3B:
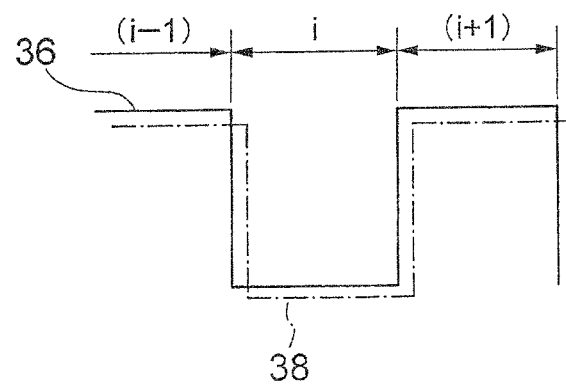
FIG. 3B is a waveform diagram of a driving signal applied in the transmissive region of the pixel of FIG. 1, both in a specific frames.

FIG. 3A shows a driving waveform diagram showing the signal potential of the pixel electrode 35 and common electrode 37 in the reflective region 21 at a specific stage of operation, and FIG. 3B shows the signal potential for the pixel electrode 36 and common electrode 38 in the transmissive region 22 at the same stage. As shown in these figures, the signal potential of the first and second common electrodes 37, 38 is inverted at a specific timing between zero volt and 5 volt, for example, and the signal potential of the first common electrode 37 is inverted from the signal potential of the second common electrode 38.

The pixel electrodes 35, 36 are applied with any desired signal potential between zero volt and 5 volts, for example. The pixel electrodes 35, 36, which are connected to the common data line 32, receive a common data signal. As exemplified in FIG. 3A, when the pixel electrode 35 is applied with a zero-volt data and the common electrode 37 is applied with a 5-volt data in an i-th frame, the potential difference between the pixel electrode 35 and the common electrode 37 assumes 5 volts. Thus, the LC layer 13 in the reflective region 21 is driven by 5 volts. In the same i-th frame, as shown in FIG. 3B, the pixel electrode 36 is applied with the zero-volt data signal and the common electrode 38 is applied with a zero-volt data, whereby the potential difference therebetween assumes zero volt. Thus, the LC layer 13 in the transmissive region 22 is not driven, i.e., driven by zero volt.

Figure 4A:
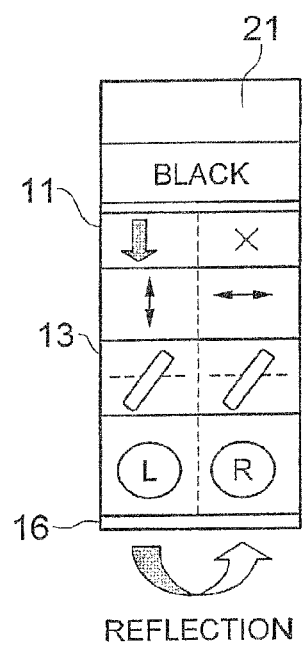
FIGS. 4A and 4B schematically show polarized state of the light in portions of the reflective region and transmissive region, respectively, applied with driving signals shown in FIGS. 3A and 3B.
Figure 4B:
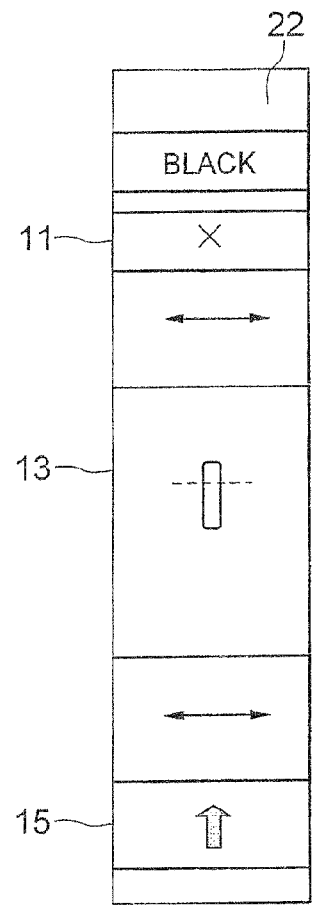

FIGS. 4A and 4B show polarized state of the light in the respective portions in the reflective region 21 and transmissive region 22, respectively, when the LC device 10 is applied with the respective driving signals shown in FIGS. 3A and 3B. Upon application of the driving signal shown in FIG. 3A, the orientation of the LC layer 13 in the reflective region 21 is rotated by 45 degrees due to the potential difference between the pixel electrode 35 and the common electrode 37. Thus, as shown in the left column of FIG. 4A, the 90-degree linearly-polarized light passed by the first polarizing film 11 changes the polarized state thereof after passing through the LC layer 13 to thereby shift to a counterclockwise-circularly-polarized light. The counterclockwise-circularly-polarized light is reflected by the reflection film 16 to shift to a clockwise-circularly-polarized light, as shown by the right column of FIG. 4A, again passed by the LC layer 13 to shift to a zero-degree linearly-polarized light, and incident onto the first polarizing film 11. The first polarizing film 11 blocks the zero-degree linearly-polarized light, thereby representing a dark state in the reflective region 21.

On the other hand, as shown in FIG. 4B, absence of the electric field due to a zero potential difference between the pixel electrode 36 and the common electrode 28 allows the orientation of the LC layer 13 in the transmissive region 22 to remain at 90 degrees. Thus, the zero-degree linearly-polarized light passed by the second polarizing film 15 maintains the polarized state thereof after passing through the LC layer 13, and is incident onto the first polarizing film 11, which blocks the incident light, thereby representing a dark state in the transmissive region 22.

As described above, by applying an inverted signal and a non-inverted signal to the first and second common electrodes 37, 38, a common data signal applied to both the pixel electrodes 35, 36 is sufficient for representing a dark state in both the reflective region 21 and transmissive region 22. This is because the inverted signal and non-inverted signal allow the orientation of the LC layer 53 to be rotated by 45 degrees only in the reflective region 21. Thus, both the reflective region 21 and transmissive region 22 assume a dark state without the necessity of applying different data signals.

Figure 5A:
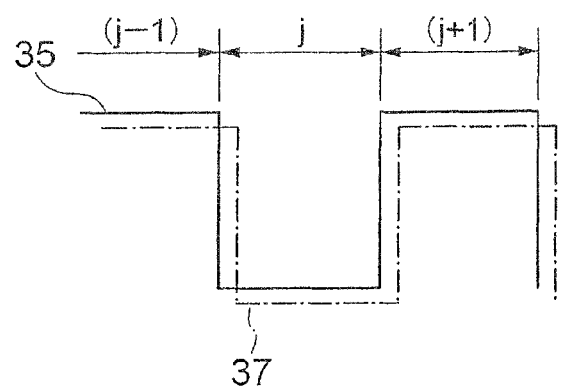
FIGS. 5A and 5B are waveform diagrams showing, similarly to FIGS. 3A and 3B, respectively, driving signals in frames different from the specific frames shown in FIGS. 3A and 3B.
Figure 5B:
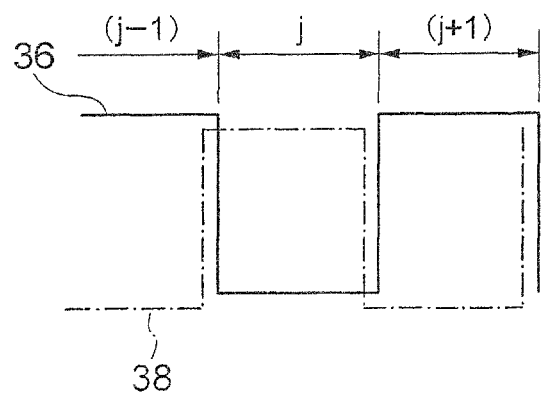
Figure 6A:
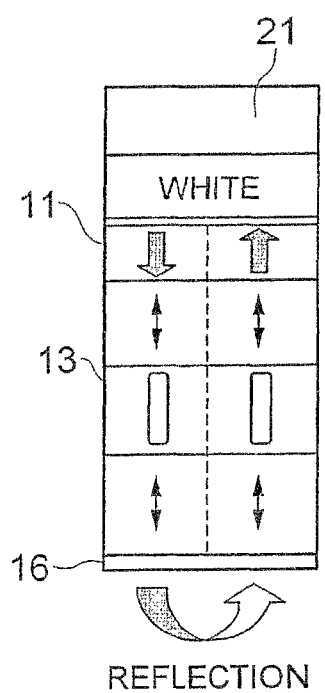
FIGS. 6A and 6B schematically show, similarly to FIGS. 4A and 4B, polarized state of the light in portions of the reflective region and transmissive region.
Figure 6B:
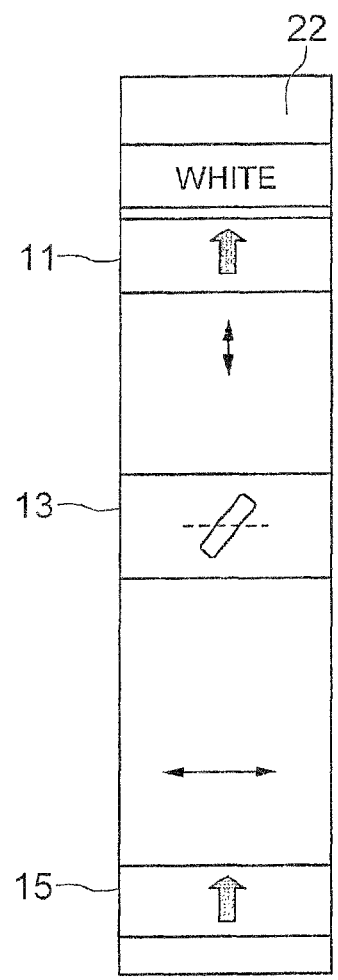

FIGS. 5A and 5B each show, similarly to FIGS. 3A and 3B, a driving waveform signal at another stage of operation. FIGS. 6A and 6B show, similarly to FIGS. 4A and 4B, polarized state of light at the another stage. In the another stage shown in FIG. 5A, the signal potential applied in the j-th frame between the pixel electrode 35 and the common electrode 36 provides no electric field to the LC layer 13 in the reflective region 21, whereby the orientation of the LC layer 13 in the reflective region 21 remains at 90 degrees. Thus, as shown in FIG. 6A, the 90-degree linearly-polarized light passed by the first polarizing film 11 passes through the LC layer 13 in the reflective region 21 as it is, is reflected by the reflection film 16, passes through the LC layer 13, and is incident onto the first polarizing film 11 without changing the polarized state thereof. Thus, the polarizing film 11 passes the light to represent a bright state in the reflective region 21.

On the other hand, in the j-th frame shown in FIG. 5B, the orientation of the LC layer 13 in the transmissive region 22 is rotated by 45 degrees due to the electric field formed by the potential difference between the pixel electrode 36 and the common electrode 38. Thus, as shown in FIG. 6B, the 90-degree linearly-polarized light passed by the second polarizing film 15, passes through the LC layer 13 in the transmissive region 22 to shift to a 90-degree linearly-polarized light, and is incident onto the first polarizing film 11. The first polarizing film 11 passes the incident light to represent a bright state in the transmissive region 22. Thus, both the reflective region 21 and transmissive region 22 assume a bright state without the necessity of applying different data signals.

Figure 7A:
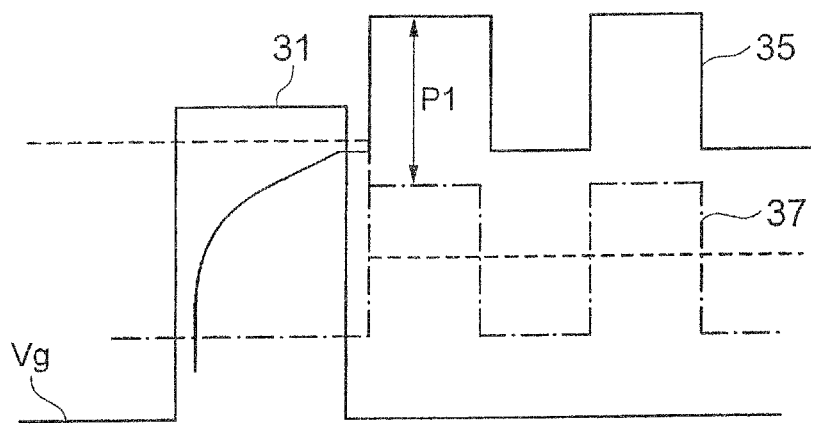
FIG. 7A shows potential change of the pixel electrode and common electrode disposed in the reflective region.
Figure 7B:
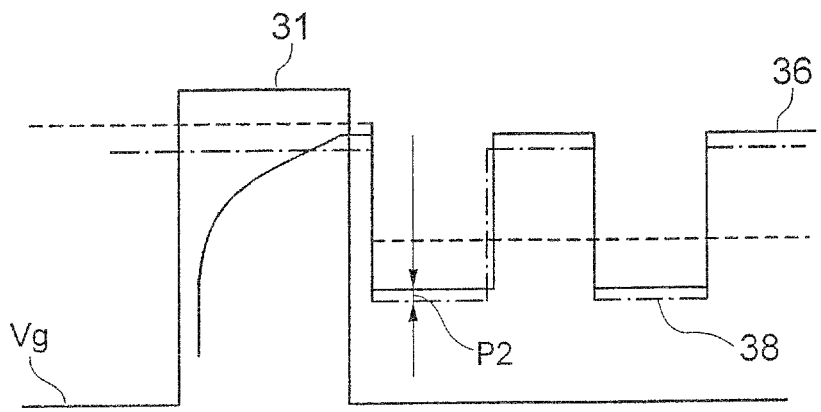
FIG. 7B shows potential change of the pixel electrode and common electrode disposed in the transmissive region.

FIGS. 7A and 7B show the transient potential of the pixel electrodes 35 and 36, respectively, after applying the data signal. In the case of a gate-line-inversion driving scheme for the LCD device 10 shown in these figures, the polarity of the driving signal is inverted at every frame end for each pixel, and two adjacent rows receive opposite polarities. After a gate signal pulse Vg is applied to the gate line 31 and removed therefrom, the potential polarity of the common electrodes 37, 38 repeats inversion at every frame by responding to the polarity inversion of the driving signal in each row until a next gate signal pulse is applied to the gate line 31.

Since the TFTs 33, 34 are turned OFF during this interval, the pixel electrodes 35, 36 are isolated from the data line 32 and reside in a floating state. Thus, the potential of the pixel electrodes 35, 36 fluctuates as shown in the figures due to the capacitive coupling between the pixel electrodes 35, 36 and the common electrodes 37, 38, while maintaining the initial potential differences P1, P2 at the time of writing the data signal into the pixel electrodes 35, 36. In this case, the situation of the potential fluctuation is different between the pixel electrode 35 and the pixel electrode 36 after the writing of data signal into the pixel electrodes 35, 36, as will be understood from FIGS. 7A and 7B.

In the present embodiment, the common electrode of a pixel is separated into the first and second common electrodes 37 and 38 corresponding to the reflective region 21 and the transmissive region 22, respectively. The inverted and non-inverted signals applied to these common electrodes 37, 38 allow the electric fields applied to the LC layer 13 in the reflective region 21 and the transmissive region 22 to have opposite magnitudes so that the same gray-scale-level is obtained both in the reflective region 21 and the transmissive region 22. The term "opposite magnitudes" as used herein means that when one of the regions has a larger (maximum, for example) electric field, the other of the regions has a corresponding lower (minimum, for example) electric filed. Thus, the reflective region 21 and the transmissive region 22 of each pixel are applied with the same data signal to represent the same gray-scale level in the image, whereby the image-inversion problem encountered in the conventional IPS-mode LCD device can be solved without employing a complicated signal scheme.

In the present embodiment, the orientation of the LC layer 13 in the transmissive region 21 during display of a dark state is parallel or normal to the polarized direction of the light incident onto the LC layer 13. This reduces the adverse influence by the wavelength dispersion characteristic of the LC layer 13 on the image during display of a dark state, whereby leakage light is reduced during the display of a dark state. The relationship between the first and second polarizing films 11, 15 and the orientation of the LC layer 23 in the transmissive region 22 is similar to that in the typical transmissive IPS-mode LCD device, whereby a contrast ratio in the transmissive region 22 in the present embodiment is similar to that achieved in the typical transmissive IPS-mode LCD device.

In the typical TN-mode LCD device, the reflection film is generally configured as a reflective pixel electrode, which is applied with a data signal for driving the LC layer corresponding to a desired gray-scale level. On the other hand, in the IPS-mode LCD device, the LC layer is driven by the electric field applied by the pixel electrode and the common electrode. This allows the reflection film 16 to be applied with any desired voltage. The influence by the potential of the reflection film 16 on the image will be discussed hereinafter.

Figure 8A:
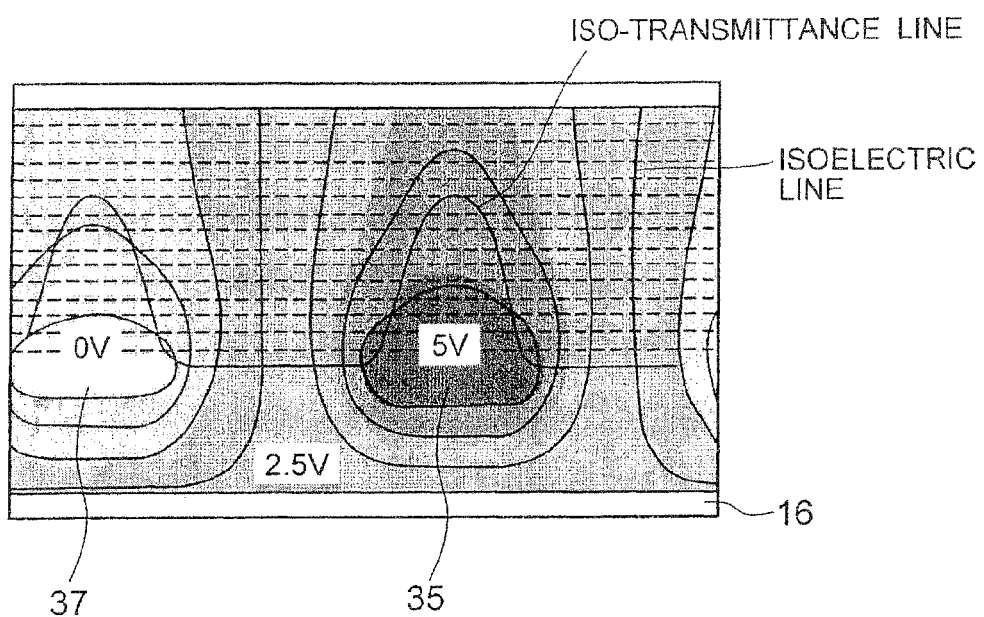
FIGS. 8A and 8B each show a potential distribution together with a leakage-light distribution by using isoelectric line and iso-transmittance line, which are obtained by a simulation.
Figure 8B:
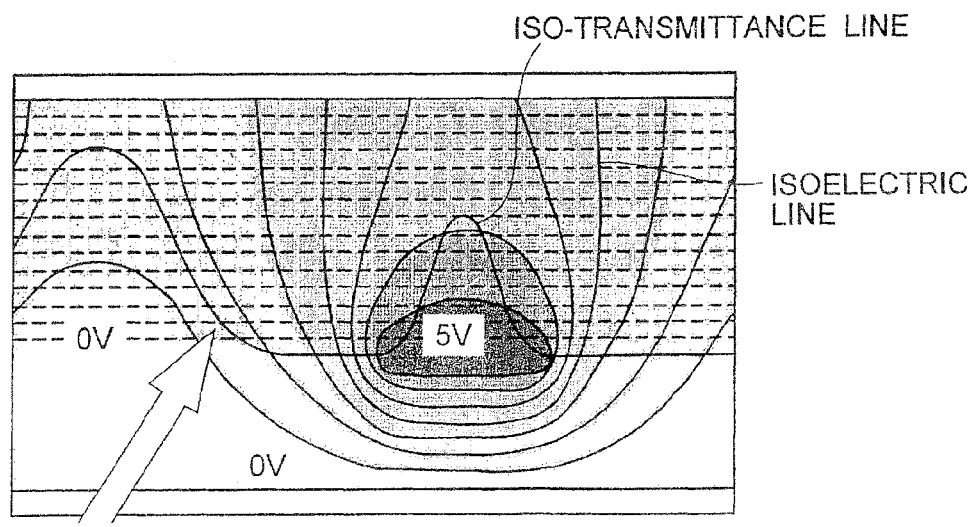

FIGS. 8A and 8B show an electric field distribution, and an optical transmittance distribution obtained by a simulation in the reflective region 21 in the case of the reflection film 16 being applied with 2.5 volts and 5 volts, respectively, with the pixel electrode 35 and common electrode 37 being fixed at 5 volts and zero volt, respectively.

If the potential of the reflection film 16 is a median between the potential of the pixel electrode 35 and the potential of the common electrode 37, as shown in FIG. 8A, a significant leakage light is observed in the area of the pixel electrode 35 and the common electrode 37 due to a higher transmittance of the LC layer in this area; however, a lower leakage light is observed in the gap between the pixel electrode 35 and the common electrode 37. On the other hand, if the reflection film 16 is equi-potential with the common electrode 37, as shown in FIG. 8B, a significant leakage light is observed in the area of the common electrode 37 due to a higher transmittance in this area. The reason for the optical transmittance distribution in the latter case is possibly that a higher electric field between the pixel electrode 35 and the reflection film 16 directs the electric field (electric flux line), which would otherwise converge to the common electrode 37, toward the reflection film 16, and thus the electric field for driving the LC molecules in the area of the common electrode 37 is insufficient.

As understood from the above results of simulation, the potential of the reflection film 16 is a median between the pixel electrode 35 and the common electrode 37. The potential of the reflection film 16 may be directly controlled by applying a specific voltage, or may be indirectly controlled by a capacitive coupling while floating the potential of the reflection film 16. If the capacitive coupling is to be employed, for example, a first interconnect applied with the equi-potential with the pixel electrode 35 and a second interconnect applied with the equi-potential with the common electrode 37 are provided on the rear side of the reflection film 16 so that the area ratio of the first interconnect to the second interconnect is set at 1:1, whereby the potential of the reflection film 16 assumes the median.

Figure 9:
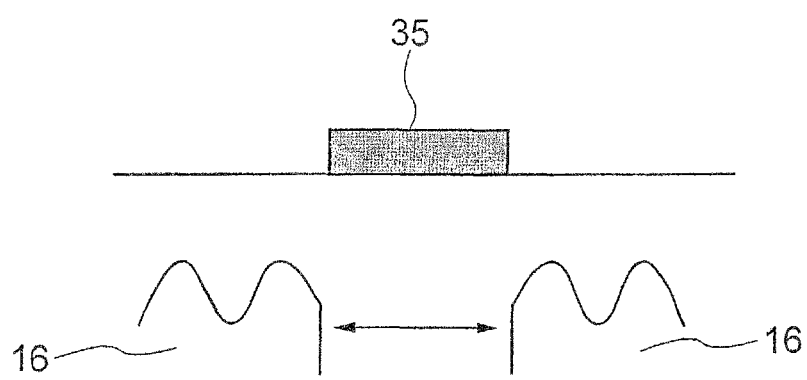
FIG. 9 is a sectional view of the reflective film in the vicinity of the pixel electrode or common electrode.
Figure 12A:
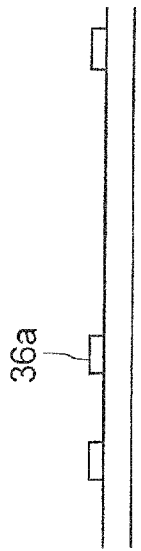
FIG. 12A is a top plan view of the TFT substrate in a step subsequent to the step shown in FIG. 11A, and FIGS. 12B to 12D are sectional views taken along lines corresponding to lines A-A', B-B' and C-C', respectively, in FIG. 10A.
Figure 12B:
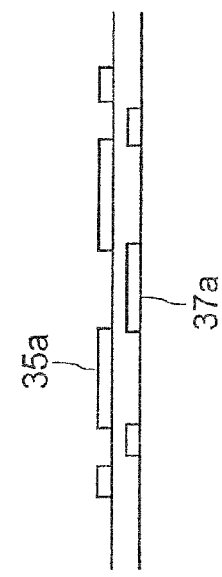
Figure 12C:
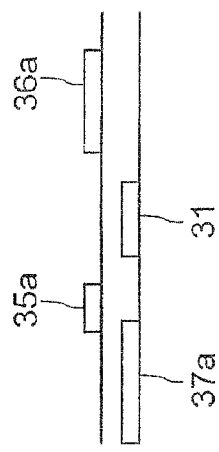
Figure 12D:
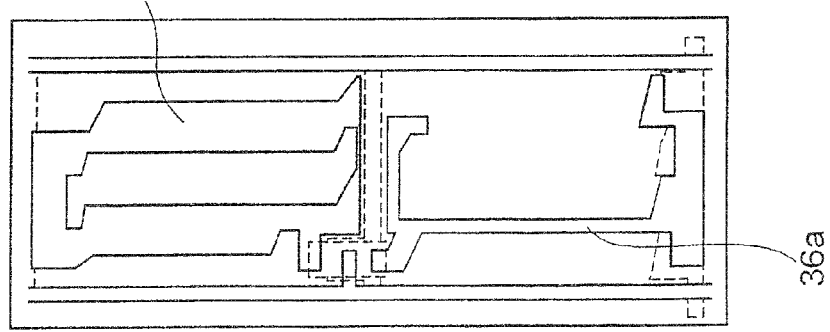
Figure 13A:
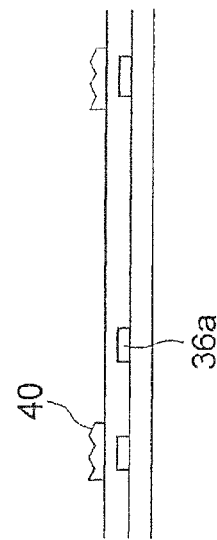
FIG. 13A is a top plan view of the TFT substrate in a step subsequent to the step shown in FIG. 12A, and FIGS. 13B to 13D are sectional views taken along lines corresponding to lines A-A', B-B' and C-C, respectively, in FIG. 10A.
Figure 13B:
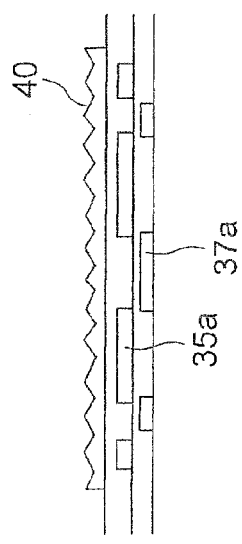
Figure 13C:
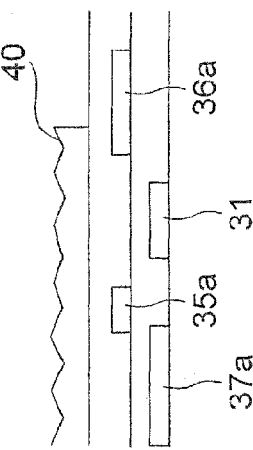
Figure 13D:
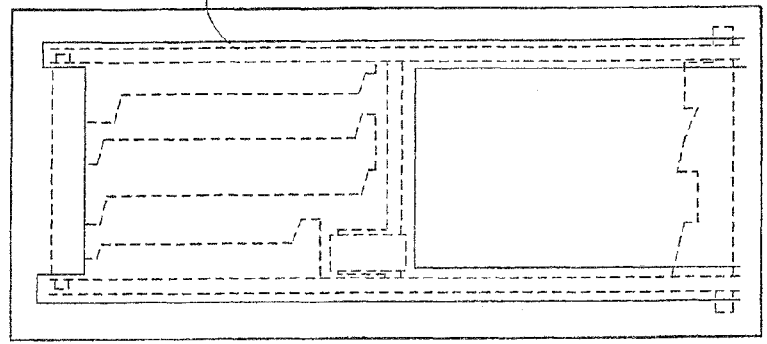

As shown in FIG. 8A, the median potential of the reflection film 16 incurs a significant leakage light in the area of the pixel electrode 35 and the common electrode 37, which is undesirable because a higher optical transmittance occurs therein during display of a dark state. For suppressing the adverse influence by the leakage light on the image, a pattern configuration wherein the reflection film 15 does not have a portion overlapping the pixel electrode 35 and the common electrode 37 as observed normal to the substrate may be employed, as shown in FIG. 9. This configuration reduces the luminance of the reflected light observed in the area of the pixel electrode 35 and the common electrode 37 during display of a dark state.

A process for manufacturing the TFT substrate in the LCD device of FIG. 1 will be described hereinafter with reference to FIGS. 10A to 17A showing top plan view in consecutive steps of fabrication and additional sectional views. The additional sectional figures depict the reflective region 21, transmissive region 22 and boundary between the reflective region 21 and the transmissive region 22, and are designated by a numeral equal to the numeral of the corresponding top plan views and attached with alphabetic symbols following to the alphabetic symbol "A" in the order of the alphabetic symbols shown in the corresponding top plan views. For example, FIGS. 10B, 10C and 10D are sectional views taken along lines A-A' in the reflective region 21, B-B' in the transmissive region 22, and C-C' in the boundary, respectively, shown in FIG. 10A.

First, gate lines 31, first common electrode lines 37a and second common electrode lines 38a are formed as shown in FIGS. 10A to 10D. In this step, the first common electrode lines 37a are formed to extend toward the reflective region 21 from the bus line for providing a potential to the reflection film 15. The gate lines 31, first common electrode lines 37a and second common electrode lines 38a are then covered with an insulation film deposited thereon.

Subsequently, as shown in FIG. 11A, a semiconductor layer 39 is formed which later configures source/drain regions of the TFTs 33. In this step, as shown in FIG. 11B, the semiconductor layer 39 is formed to overlap the gate lines (or gate electrodes) 31. Thereafter, pixel electrode lines 35a connected to the source/drain regions of the TFTs 33 and pixel electrode lines 36a connected to the source/drain regions of the TFTs 34 are formed, as shown in FIGS. 12A to 12D.

In the reflective region 2, one of the first common electrode lines 37a is interposed between two adjacent pixel electrode lines 35a as viewed normal to the substrate. The area ratio of the first common electrode lines 37a to the pixel electrode lines 35a is set at 1:1 in the pixel. This allows the reflection film 16 to assume a median potential between the pixel electrode 35 and the first common electrode 37. The pixel electrodes 35, 36 are then covered by an insulator film deposited thereon.

Subsequently, an overcoat layer 40 having a convex/concave surface is formed on the reflective area 21 and a periphery of the transmissive area 22, as shown in FIGS. 13A to 13D. An aluminum film is deposited on the entire surface and patterned to form reflection film 16 in the reflective region 1. The reflection film 16 ha a slit at the center of each pixel electrode line 35*a* and each first common electrode lines q5C.

After forming the reflection film 16, a flat overcoat film 41 is formed thereon having a pattern shown in FIG. 15A in the substantially entire area of the pixel. The flat overcoat film 41 has a step portion between the reflective region 21 and the transmissive region 22, as shown in FIGS. 15B to 15D, thereby adjusting the difference of the cell gap therebetween. Subsequently, contact holes 42 are formed in the insulator film to expose the pixel electrode lines 35*a*, 36*a*, first common electrode lines 37*a*, second common electrode line 38*a*, as shown in FIGS. 15A and 15B.

After forming the contact holes 42, the pixel electrodes 35, 36, first common electrode 37, second common electrode 38 are formed on the flat overcoat film in a pattern shown in FIG. 17A. The section of the reflective region 21, transmissive region and the boundary therebetween are shown in FIGS. 17B, 17C and 17D, respectively. The pixel electrode 35, 36, first common electrode 37 and second common electrode 38 are connected to the pixel electrode line 35*a*, 36*a* fits common electrode line 37*a*, and second common electrode lines 38*a*, rex, via respective contact holes 42. Thus, the TFT substrate 14 for use in the transflective LCD device of the present embodiment is obtained.

Figure 18:
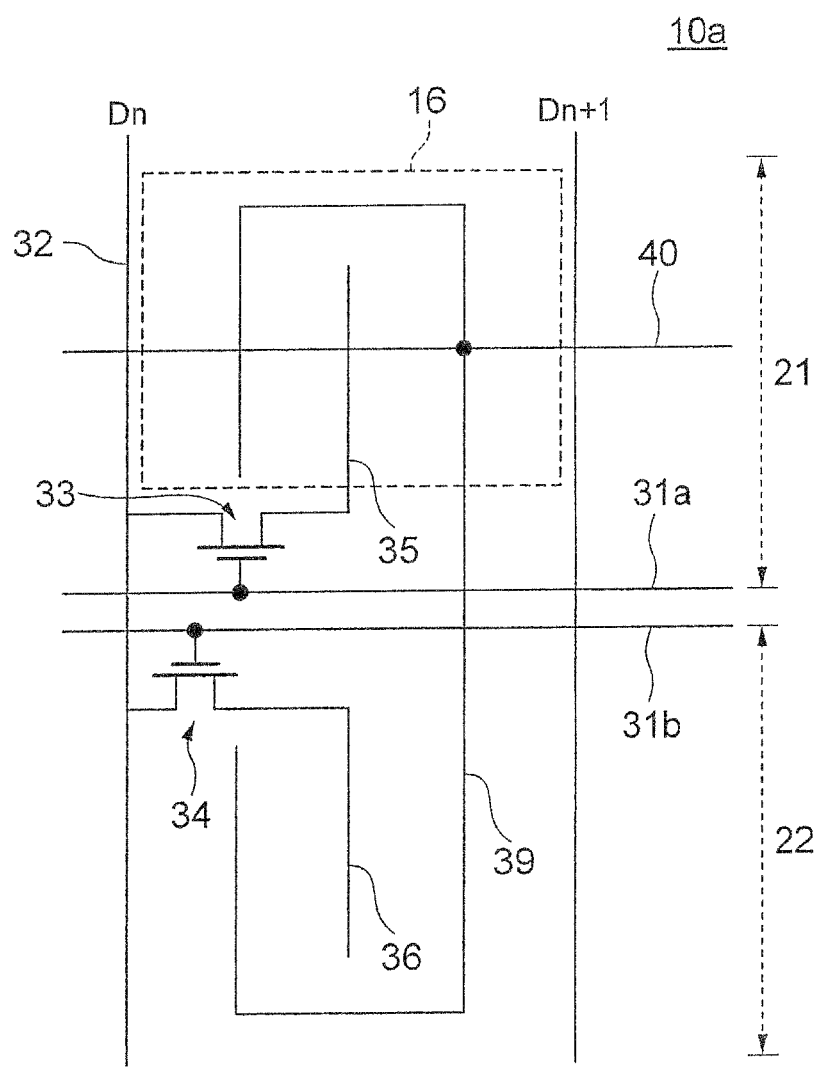
FIG. 18 is a schematic top plan view of a LCD device according to a second embodiment of the present invention.

FIG. 18 is a top plan view of a TFT substrate, showing a pixel of a transflective LCD device according to a second embodiment of the present invention. The LCD device of the present embodiment, generally designated by numeral 10*a*, has a sectional structure similar to that of the LCD device 10 of the first embodiment, and includes first polarizing film, counter substrate, LC layer, TFT substrate, and second polarizing film. The polarizing axis of the first and second polarizing films as well as the orientation of the LC layer in the present embodiment is also similar to that in the first embodiment. The LCD device of the present embodiment is different from the LCD device of the first embodiment in the planar structure of the pixel, and the scheme of signal transfer via the gate lines 31 and data lines 32.

As understood from FIG. 18, a plurality of gate lines 31 extending in the row direction and a plurality of data lines 32 extending in the column direction are formed on the TFT substrate. TFTs 33, 34 are provided in the vicinity of each of the intersections between the gate lines 31 and data lines 32. The gate lines 31 for each row of the pixels include a gate line 31*a* connected to the gate of the TFTs 33, and a gate line 31*b* connected to the gate of the TFTs 34. The TFTs 33 each have a source/drain path connected between a data line 32 and the first pixel electrode 35 provided in the reflective region 21, whereas the TFTs 34 each have a source/drain path connected between the same data line 32 and the second pixel electrode 36 in the transmissive region 22. The common electrode 39 formed in common, to the reflective region 21 and transmissive region 22 is connected to a single common electrode (COM) line 40, which supplies a common electrode signal to all the pixels of the LCD device 10*a*.

Figure 19:
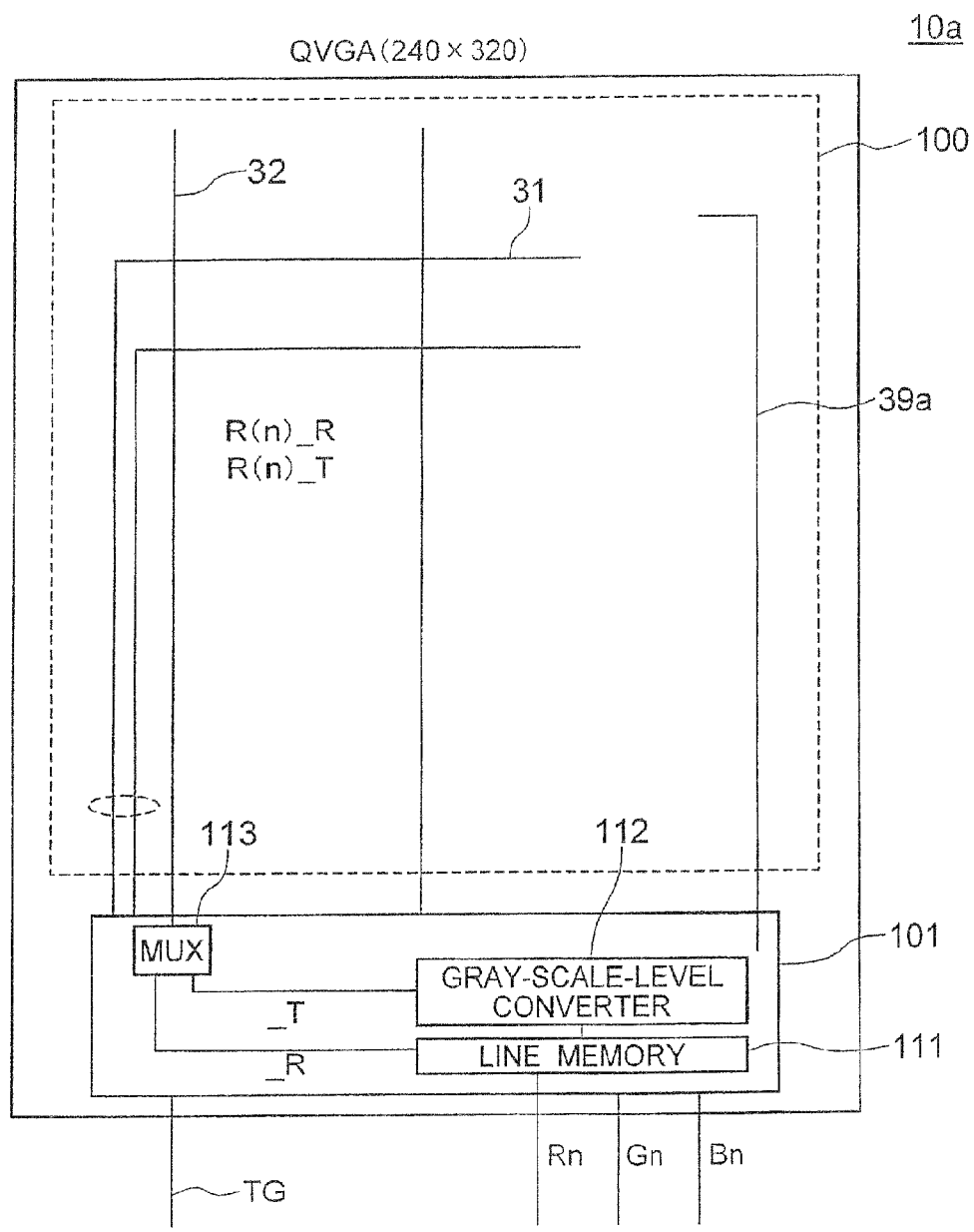
FIG. 19 is a schematic block diagram of the LCD device shown in FIG. 18.

FIG. 19 shows the overall configuration of the LCD device 10*a* of FIG. 18 including a LCD driver 101. The LCD device 10*a* includes, for example, 240 (column)×320 (row) pixels in a display area 100. The number of gate lines 31 is the sum of the number of gate lines 31*a* corresponding to the reflective region 21, and the number of gate lines 31*b* corresponding to the transmissive region 22, amounting to 640 in this example. The LCD driver 101 includes a line memory 111 having a memory capacity of a single row or more, and a gray-scale-level converter (γ-converter) 112 disposed for writing data in the transmissive region 21. The LCD driver receives 101 an external timing signal TG, and serial data signals Rn, Gn, Bn each including a digital 8-bit RGB signal for each pixel.

The LCD driver 101 in the present embodiment includes a gate-timing-signal generator and a data-timing-signal generator (both not shown in the figure) for generating respective timing signals based on the external timing signal. For generating the timing signals in the LCD driver 101, the timing signals for a single row of the pixels are separated into two timing signal series including a timing signal series for the reflective region 21 and a timing signal series for the transmissive region 22. These timing signals are used for driving the gate lines 31*a* and gate lines 31*b*. The gate signals supplied to the gate liens 31*a*, 31*b* are generated in the LCD driver 101, or may be generated in a shift register disposed on the TFT substrate.

The gray-scale-level conversion circuit 112 includes a look-up table for generating a gray-scale level for the transmissive region 22 based on the gray-scale level for the reflective region received from the external circuit. More specifically, the LCD driver 101 temporarily stores the received pixel data in the line memory 111. At the timing Tg(R) for writing data in the reflective region 21, the LCD driver 101 converts the received pixel data signals into parallel analog signals, by using a serial-to-parallel conversion and a digital-to-analog (D/A) conversion without using the gray-scale-level conversion circuit 112, ant outputs the analog pixel signals to the data lines 32 via a multiplexer (MUX) 113. At the timing Tg(T) for writing data in the transmissive region 22, the LCD driver 101 allows the gray-scale-level converter 112 to convert the received pixel data stored in the line memory 111 into inverted pixel data, then performs a serial-to-parallel conversion and a D/A conversion, and outputs the analog pixel signals to the data line 32 via the multiplexer 113. The gray-scale-level converter 111 may perform a γ-conversion in addition to the gray-scale level conversion by using a look-up table in order to obtain similar 7 characteristics in the data for both the reflective region 21 and transmissive region 22.

For example, if a pixel data signal K(n,m)=0 is received in the LCD driver 101 for a K-th pixel disposed at an n-th row and am m-th column, the LCD driver performs a D/A conversion to the zero gray scale data (R(n,m)=0) at the timing Tg(R) for writing data into the reflective region 21 of the K-th pixel, and outputs the corresponding analog data, such as a zero-volt or 10-volt signal, to the data line 32. On the other hand, at the timing Tg(T) for writing the data into the transmissive region 22 of the same K-th pixel, the LCD driver 101 allows the gray-scale-level converter 112 to convert the pixel data signal K(n,m)=0 into K(n,m)=255, performs serial-to-parallel conversion and D/A conversion to the converted data K(n,m)=255, and outputs the corresponding analog data, such as a 5-volt signal, to the data line 32.

Figure 20:
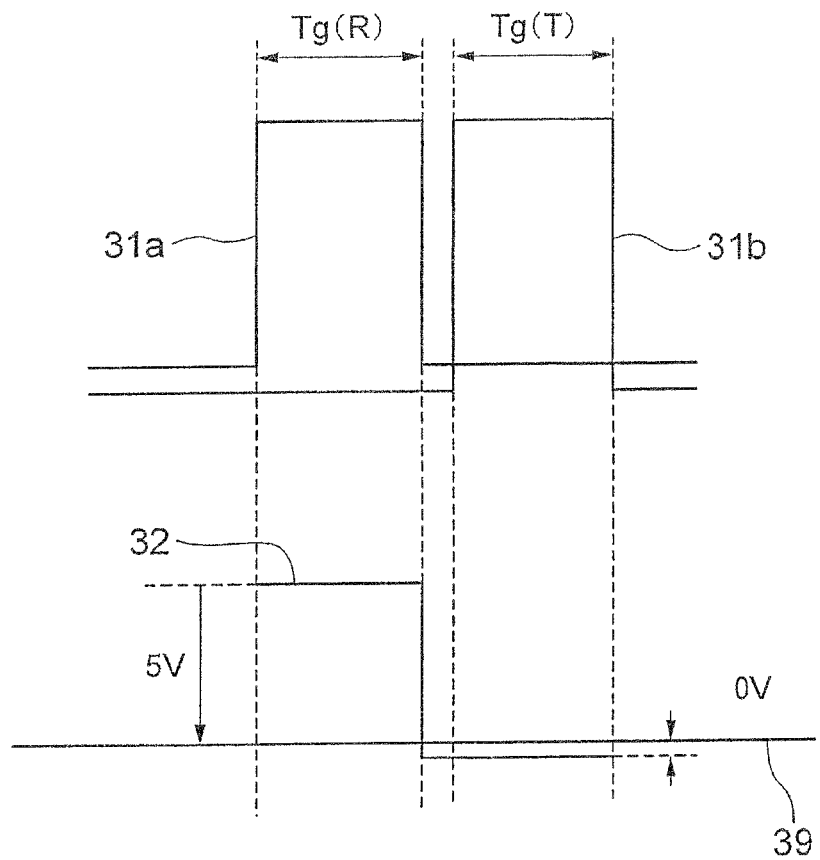
FIG. 20 is a driving-signal waveform diagram in the LCD device shown in FIG. 18.

FIG. 20 shows a driving-signal waveform for both the reflective region 21 and transmissive region 22 at a specific stage of operation in the LCD device. The driving signal depicted therein includes a gate signal supplied to the gate lines 31*a*, 31*b* and a data signal supplied to the data line 32. In this example, a dot inversion driving scheme is used and the common electrode signal is constant. The writing period for a single pixel (or single line) is divided into a first writing period for writing data into the reflective region 21, and a second writing period for writing data into the transmissive region 22, whereby the gate lines 31*a* and 31*b* are driven by a high-level gate signal at different timings. The TFT 33 for the reflective region 21 is turned ON at the first timing Tg(R) or first writing period during which the gate line 31*a* is applied with a high-level potential, and writes the data supplied through the data line 32 into the pixel electrode 35 in the reflective region 21. The TFT 34 for the transmissive region 22 is turned ON at the second timing Tg(T) or second writing period during which the gate line 31b is applied with a high-level potential, and writes the data supplied through the data line 32 into the pixel electrode 36 in the transmissive region 22.

If a zero gray-scale-level data (dark-state data) is received for the pixel, a 10-volt data is supplied to the data line 32 at the timing Tg(R) of writing the data into the reflective region 21, and the TFT 33 corresponding to the reflective region 21 is turned ON, whereby the 10-volt data signal is written into the pixel electrode 35. In this case, if the potential of the COM line 39a is fixed at 5 volts, the LC layer 13 in the reflective region 21 is applied with an electric field corresponding to the 5 volts, whereby the reflective region 21 operating in the normally-white mode assumes a dark state for the image display. On the other hand, at the timing Tg(T) for writing the data into the transmissive region 22, the data line 32 is supplied with a 5-volt data, and the TFT 34 corresponding to the transmissive region 22 is turned ON, whereby the 5-volt data is written into the pixel electrode 36. Since the common electrode 38 is applied with 5 volts, the LC layer 13 in the transmissive region 22 is not applied with an electric field, whereby the transmissive region 22 operating in the normally-black mode assumes a dark state for the image display.

In the present embodiment, as described above, the gate lines 31 in the LCD device include gate lines 31a for the reflective region 21 and gate lines 31b for the transmissive region 22, and the writing period for the pixel includes two separate writing periods, whereby the common data lines 32 can supply different data signals to the reflective region 21 and transmissive region 22. One of the regions 21, 22 receives a data signal generated based on the received pixel data in the LCD driver 101, whereas the other of the regions 21, 22 receives a data signal generated based on an inverted data generated from the received pixel data by the gray-scale-level converter 112. This configuration provides different potential differences to the reflective region 21 and transmissive region 22 without increasing the number of data lines for writing data into the pixel, the different potential differences allowing both the regions 21, 22 to represent similar gray-scale levels irrespective of the different normal modes.

Figure 21:
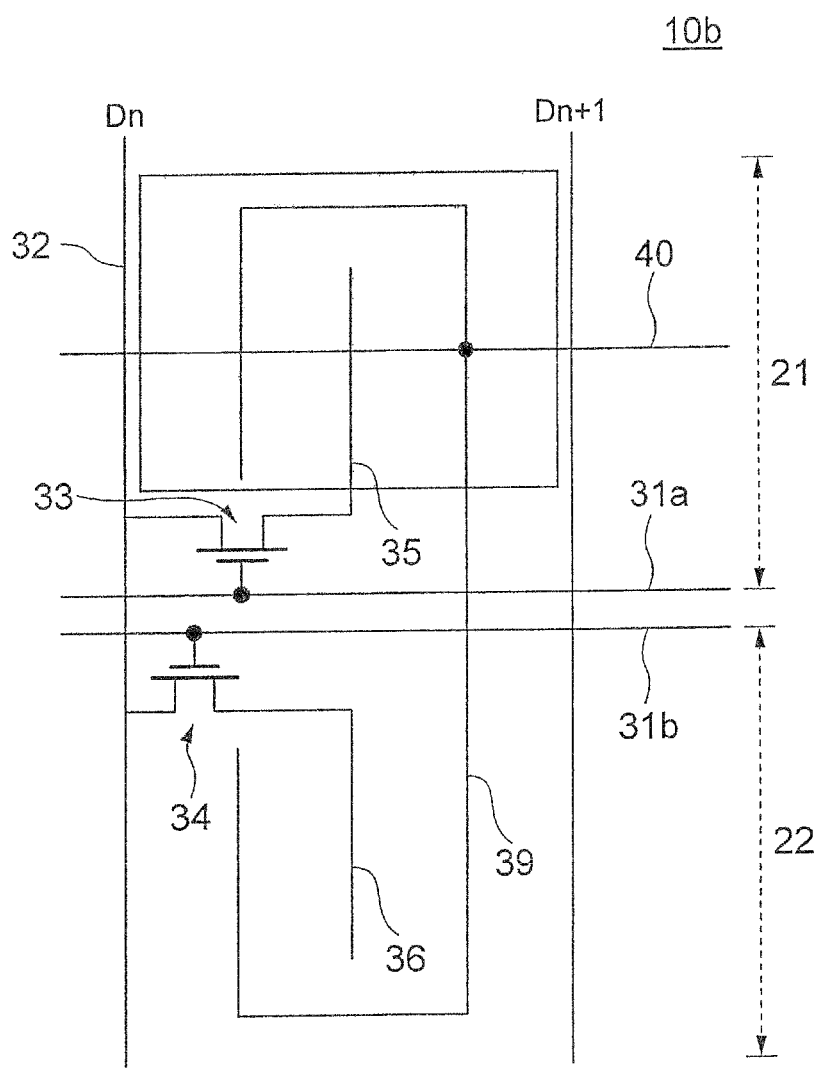
FIG. 21 is a schematic top plan view of a LCD device according to a third embodiment of the present invention.

FIG. 21 shows a schematic top plan view of a TFT substrate in a transflective LCD device according to a third embodiment of the present invention. The LCD device, generally designated by numeral 10b, has a sectional structure similar to that in the LCD device 10 of the first embodiment, and includes first polarizing film, counter substrate, LC layer, TFT substrate, and second polarizing film. The polarizing axis of the first and second polarizing films and the longer axis of the LC molecules in the present embodiment are also similar to those in the LCD device of the first embodiment. The LCD device of the present embodiment is different from the LCD device of the first embodiment in the planar structure in the pixel, and the scheme for signal transfer via the gate lines and data lines.

As understood from FIG. 21, a plurality of gate lines 31 extending in the row direction and a plurality of data lines 32 extending in the column direction are formed on the TFT substrate. TFTs 33, 34 are provided in the vicinity of each of the intersections between the gate lines 31 and data lines 32. The gate lines 31 for each row of the pixels include a gate line 31a connected to the gate of the TFTs 33, and a gate line 31b connected to the gate of the TFTs 34. The TFTs 33 each have a source/drain path connected between the data line 32 and the first pixel electrode 35 provided in the reflective region 21, whereas the TFTs 34 each have a source/drain path connected between the same data line 32 and the second pixel electrode 36 in the transmissive region 22. The common electrode 39 formed in common to the reflective region 21 and transmissive region 22 is connected to a single common electrode (COM) line 40, which supplies a common electrode signal to all the pixels of the LCD device 10a.

Figure 22:
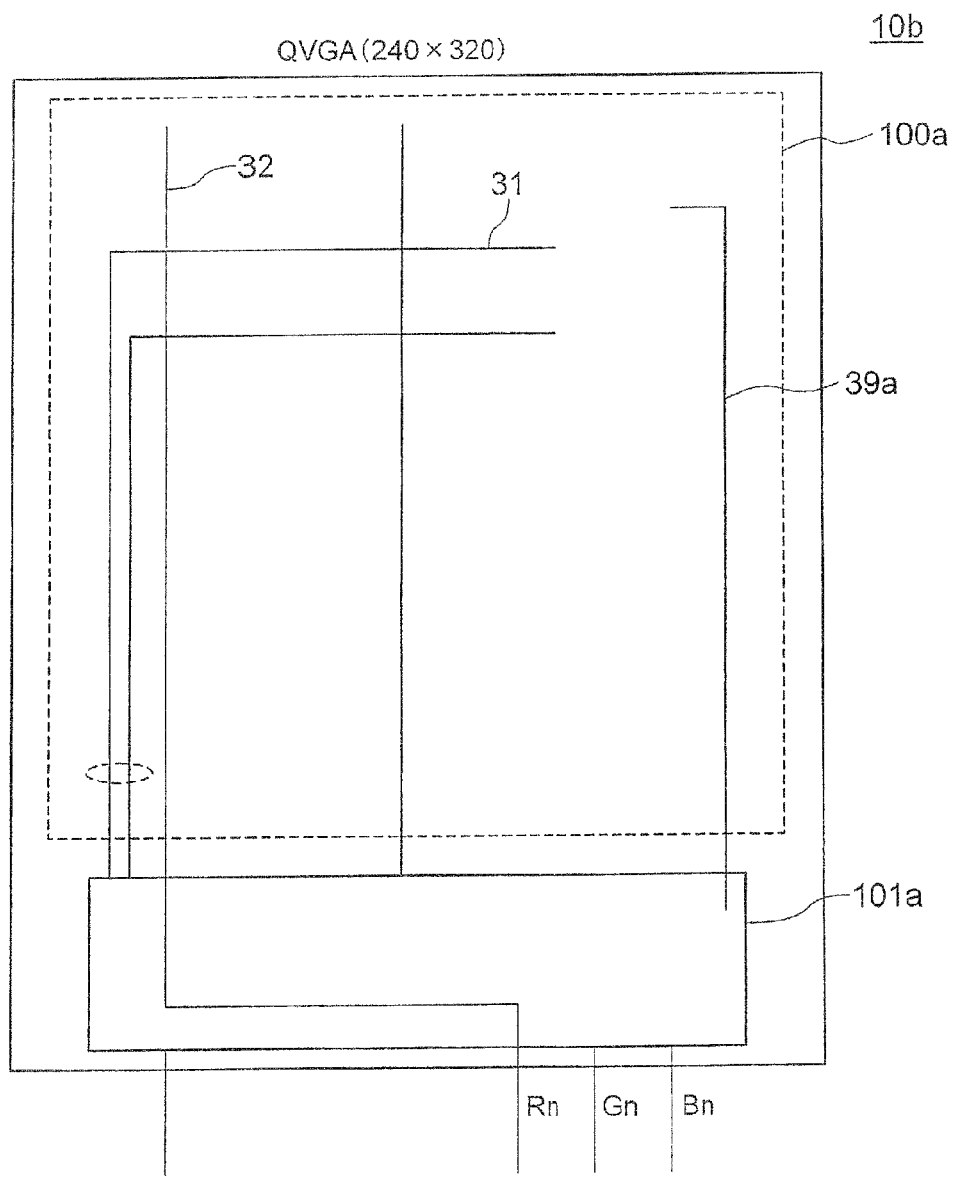
FIG. 22 is a schematic block diagram of the LCD device shown in FIG. 21.

FIG. 22 shows the overall configuration of the LCD device 10b of FIG. 21 including a LCD driver 101a. The LCD device 10b of the present embodiment is similar to the LCD device 10a of the second embodiment except that the pixel electrodes 35, 36 are supplied with the same data signal whereas the potential of the COM line 39a is changed at the time instant of half the writing period to thereby provide different voltages to the reflective region 21 and transmissive region 22 of the LC layer 13. The LCD device 10b of the present embodiment need not have the line memory and gray-scale-level converter used in the second embodiment.

Figure 23:
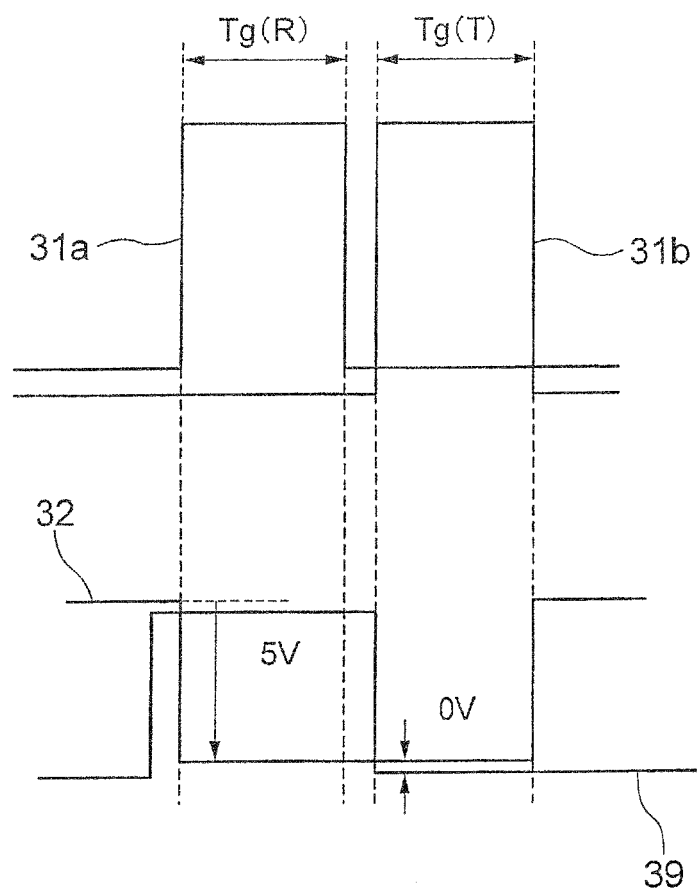
FIG. 23 is a driving-signal waveform diagram in the LCD device shown in FIG. 21.

FIG. 23 shows a driving-signal waveform for both the reflective region 21 and transmissive region 22 at a specific stage of operation in the LCD device. The driving signal depicted therein includes a gate signal supplied to the gate lines 31a, 31b and a data signal supplied to the data line 32. In this example, a dot inversion driving scheme is used. The writing period for a single pixel (or single line) is divided into a first period for writing data into the reflective region 21, and a second period for writing data into the transmissive region 22. The TFT 33 for the reflective region 21 is turned ON at the first timing Tg(R) during which the gate line 31a is applied with a high-level potential, and writes the data supplied through the data line 32 into the pixel electrode 35 in the reflective region 21. The TFT 34 for the transmissive region 22 is turned ON at the second timing Tg(T) during which the gate line 31b is applied with a high-level potential, and writes the same data signal into the pixel electrode 36 in the transmissive region 22. The LCD driver 101a supplies a common electrode signal at the first timing Tg(R) during which data is written into the reflective region 21, and an inverted common electrode signal at the second timing Tg(T) during which data is written into the transmissive region 22. For example, the common electrode signal assumes 5 volts at the first timing Tg(R) and assumes zero volt at the second timing Tg(T).

For display of a dark state, the data signal assumes zero volt in a negative frame at the timing Tg(R) of writing the data into the reflective region 21, and the TFT 33 corresponding to the reflective region 21 is turned ON, whereby the zero-volt data signal is written into the pixel electrode 35. In this case, since the potential of the common electrode 39 is 5 volts, the LC layer 13 in the reflective region 21 is applied with an electric field corresponding to the 5 volts, whereby the reflective region 21 operating in the normally-white mode assumes a dark state for the image display. On the other hand, at the timing Tg(T) for writing the data into the transmissive region 22, the data line 32 is also supplied with the zero-volt data, and the TFT 34 corresponding to the transmissive region 22 is turned ON, whereby the zero-volt data is written into the pixel electrode 36. Since the potential of the common electrode 38 is inverted at this timing to assume zero volt, the LC layer 13 in the transmissive region 22 is not applied with an electric field, whereby the transmissive region 22 operating in the normally-black mode assumes a dark state for the image display.

In the above exemplified case, the reflective region 21 is driven for a negative frame. If the reflective region 21 is driven for a positive frame, the common electrode 39 assumes zero volt during the first timing Tg(R) for writing data into the reflective region 21, and assumes 5 volts during the second timing Tg(T) for writing data into the transmissive region 22. For display of a dark state, the data signal assumes 5 volts in a positive frame at the timing Tg(R) of writing the data into the reflective region 21. The pixel electrode 35 in the reflective region 21 is applied with the 5-volt data by turn of the TFT 33 at the timing Tg(R), with the potential of the common electrode 37 being zero volt, whereby the LC layer in the reflective region is applied with an electric field corresponding to 5 volts to represent a dark state. The pixel electrode 36 in the reflective region 22 is also applied with the 5-volt data at the timing of Tg(T), with the potential of the common electrode 37 being inverted to 5 volts, whereby the LC layer 13 in the transmissive region 22 is applied with no electric field to thereby represent a dark state.

Thus, both the reflective region 21 and transmissive region 22 represent a dark state in the negative and positive frames.

In the present embodiment, as described above, the writing period for the pixel is divided into the first timing and the second timing, both the pixel electrodes 35 and 36 are supplied with the common voltage, and the potential of the common electrode 39 is inverted between the first timing and the second timing. This configuration provides different potential differences to the reflective region 21 and transmissive region 22 without generating different data signals for the reflective region 21 and transmissive region 22 the different potential differences allowing both the regions 21, 22 to represent similar gray-scale levels irrespective of the different normal modes.

Figure 24:
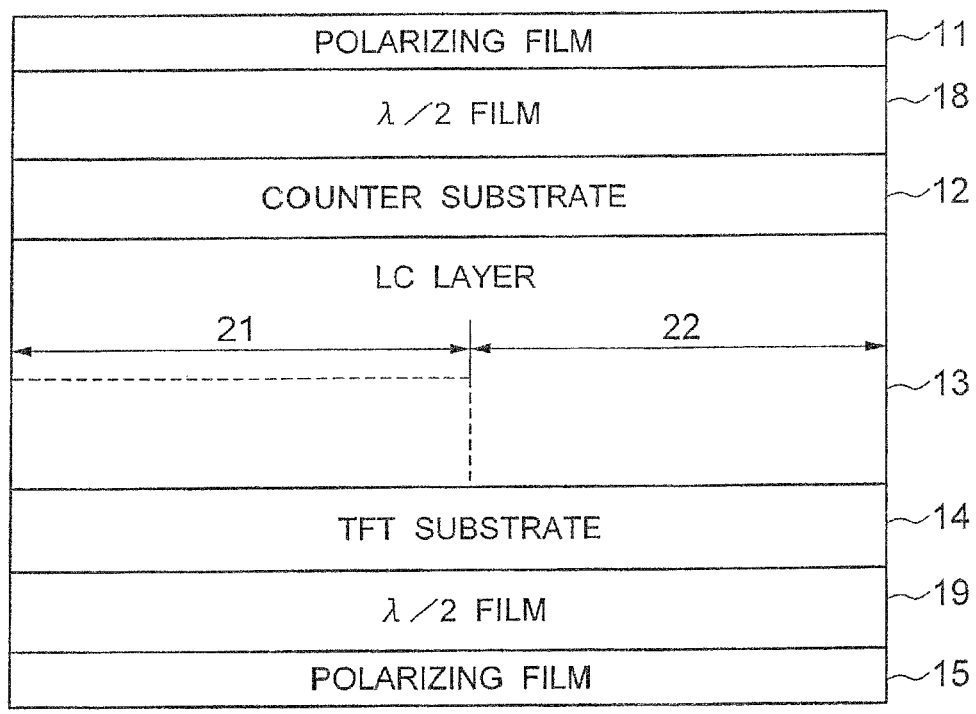
FIG. 24 is a schematic sectional view of a transflective LCD device according to a fourth embodiment of the present invention.

FIG. 24 shows schematic section view of a transflective LCD device according to a second embodiment of the present invention. The LCD device 10a of the present embodiment is similar to the LCD device of the first embodiment except that $\lambda/2$ wavelength films 18 and 19 are interposed between the first polarizing film 11 and the counter substrate 12 and between the TFT substrate 14 and the second polarizing film 15, respectively. The $\lambda/2$ wavelength films 18, 19 have respective optical axes within the plane parallel to the substrates which are perpendicular to one another. The $\lambda/2$ wavelength films prevents the image of a dark state from being observed to include blue color.

FIG. 25 shows a table showing the possible combination of the optical transmission axis of the first and second polarizing films 11, 15, longer axis of the LC molecules in the LC layer 13, and optical axis of the $\lambda/2$ wavelength films within the plane parallel to the substrates in the LCD device. In this combination, the polarized direction of the light passed by the second polarizing film 15 and the $\lambda/2$ wavelength film 19 and incident onto the LC layer 13 is set parallel or normal to the longer axis of the LC molecules in the LC layer 13. This configuration is employed so as to suppress the leakage light in the transmissive region during display of a dark state.

Figure 26:
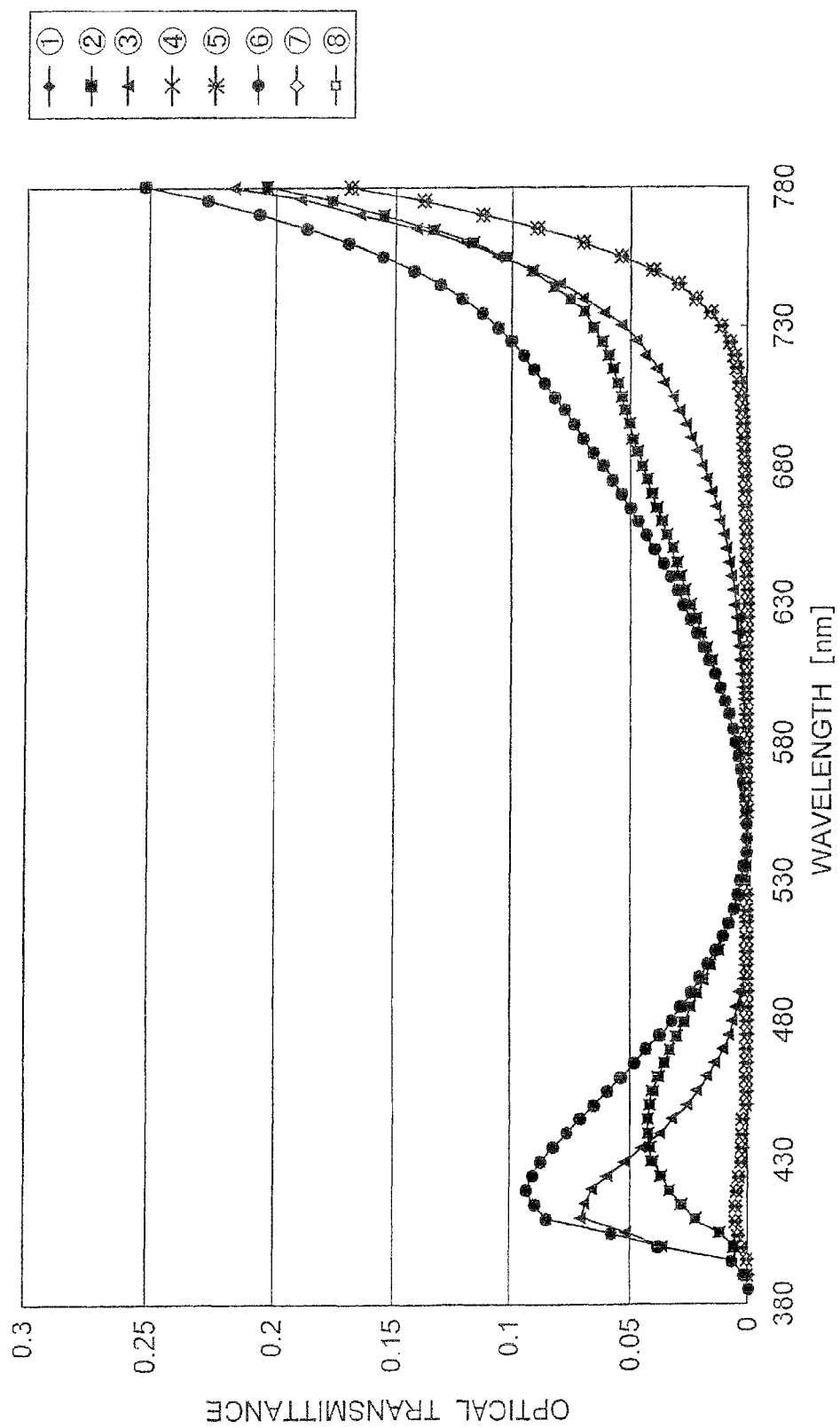
FIG. 26 is a graph showing the relationship obtained by simulation between the optical transmission and wavelength of the light in the transmissive region.

A simulation was conducted to each combination tabulated in table 1 shown in FIG. 25, thereby obtaining the results shown in FIG. 26. FIG. 25 shows that the fifth and seventh combinations have lower leakage light especially in the short wavelength region or blue color wavelength region.

The seventh combination is applied to the LCD device 10c of the second embodiment, which exhibits the polarized state shown in FIG. 21. The function of this LCD device will be described hereinafter during display of a dark state and display of a bright state.

Display of a Dark State

For display of a dark state in this embodiment, the driving signals shown in FIGS. 3A and 3B are used so as to rotate the longer axis of the LC molecules in the LC layer 13 in the reflective region 21 by 45 degrees, and maintains the longer axis of the LC molecules in the transmissive region 22 at 90 degrees. In FIG. 21, dotted line represents the direction of the polarized light, and the solid arrows represent the optical absorption axis.

In the transmissive region 22, a 135-degree linearly-polarized light passed by the second polarizing film 15 having an optical transmission axis at 135 degrees (and thus an absorption axis at 45 degrees) is rotated by an angle equal to double the difference between the polarized angle (135 degrees) of the same and the angle (157.5 degrees) of the optical axis at the $\lambda/2$ wavelength film 19 during passing through the $\lambda/2$ wavelength film 19. The light passed by the $\lambda/2$ wavelength film 19 turns into a zero-degree linearly-polarized light, which is incident onto the LC layer 13. The zero-degree linearly-polarized light passes through the LC layer 13 as it is, pass through the $\lambda/2$ wavelength film 18 to shift to a 135-degree linearly-polarized light, and is incident onto the first polarizing film 11. The first polarizing film 11 having an optical transmission axis at 45 degrees blocks the incident light transmitted from the backlight source, to thereby represent a dark state.

In the reflective region 21, the linearly-polarized light passed by the first polarizing film 11 having an optical transmission axis at 45 degrees passes through the $\lambda/2$ wavelength film 18 to shift to a 90-degree linearly-polarized light, and is incident onto the LC layer 13. The 90-degree linearly-polarized light passes through the LC layer 13 to shift to a counterclockwise-circularly-polarized light, and is reflected by the reflection film 16 to shift to a clockwise-linearly-polarized light. The clockwise-circularly-polarized light again passes through the LC layer to shift to a zero-degree linearly-polarized light and is incident onto the $\lambda/2$ wavelength film 18. The zero-degree linearly-polarized light passes through the $\lambda/2$ wavelength film 18 to shift to a 135-degree linearly-polarized light, and is incident onto the first polarizing film 11, which blocks the incident light to represent a dark state.

Display of a Bright State

Figure 27:
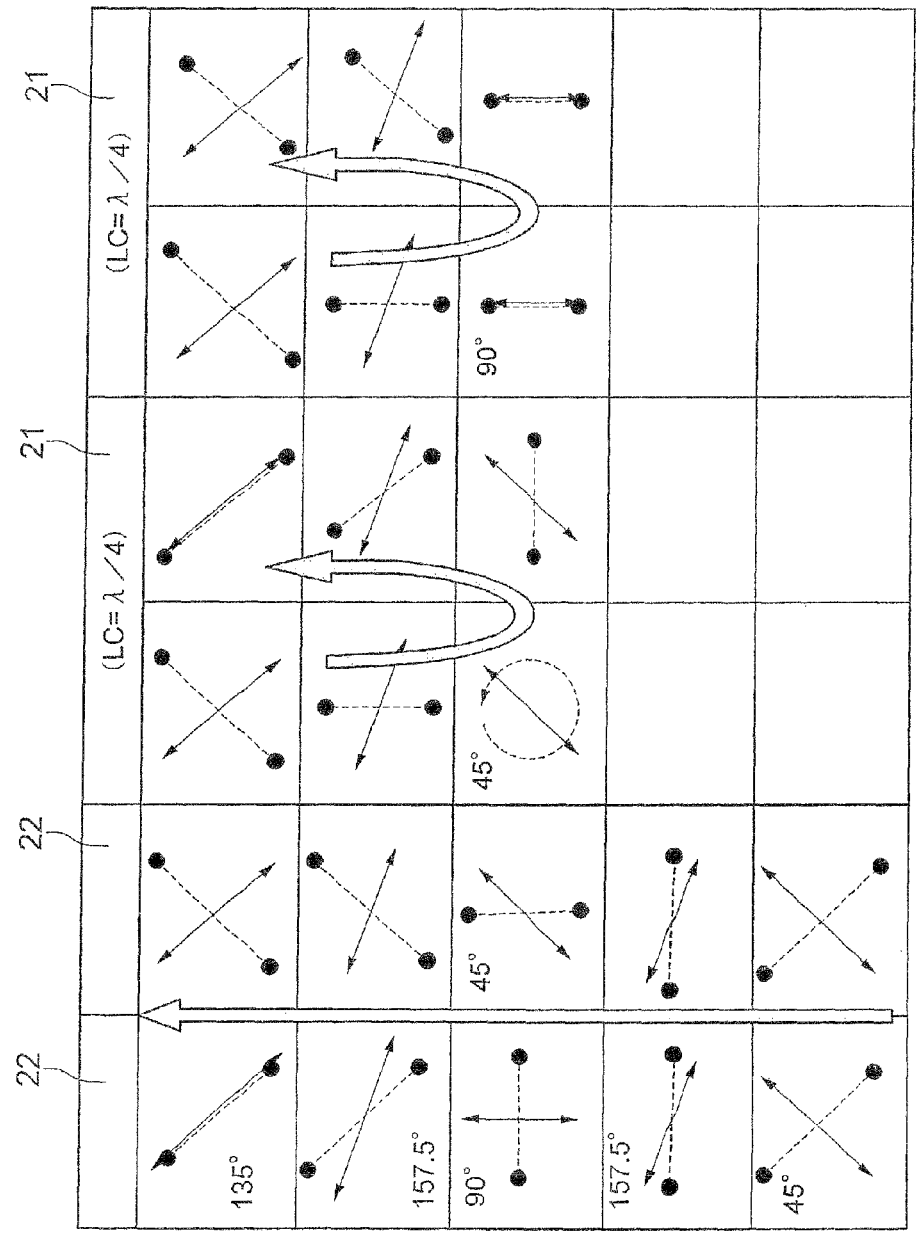
FIG. 27 is a schematic diagram showing the image represented in the transflective LCD device of the first embodiment.

For display of a bright state in FIG. 27, the LCD device is applied with driving signals shown in FIGS. 5A and 5B, to rotate the orientation of the longer axis of the LC layer 13 in the transmissive region 21 by 45 degrees, and maintains the orientation of the longer axis of the LC layer in the reflective region 21 at 90 degrees. In the transmissive region 22, a 135-degree linearly-polarized light passed by the second polarizing film 15 having an optical transmission axis at 135 degrees passes through the $\lambda/2$ wavelength film 19 to shift to a zero-degree (or 180-degree) linearly-polarized light, and is incident onto the LC layer 13. The zero-degree linearly-polarized light passes through the LC layer 13 to shift to a 135-degree linearly-polarized light, passes through the $\lambda/2$ wavelength film 18 to shift to a 45-degree linearly-polarized light, and is incident onto the first polarizing film 11, which passes the incident light to thereby represent a bright state.

In the reflective region 21, a 45-degree linearly-polarized light passed by the first polarizing film 11 passes the $\lambda/2$ wavelength film 18 to shift to a 90-degree (or 270-degree) linearly-polarized light, and is incident onto the LC layer 13. The 90-degree linearly-polarized light passes through the LC layer 13 as it is, and is reflected by the reflection film 16 to be again incident onto the LC layer 13. The 90-degree linearly-polarized light passes the LC layer 13 as it is, and passes through the $\lambda/2$ wavelength film 18 to shift to a 45-degree linearly-polarized light. The first polarizing film 11 passes the 45-degree linearly-polarized light, to represent a bright state.

Figure 28A:
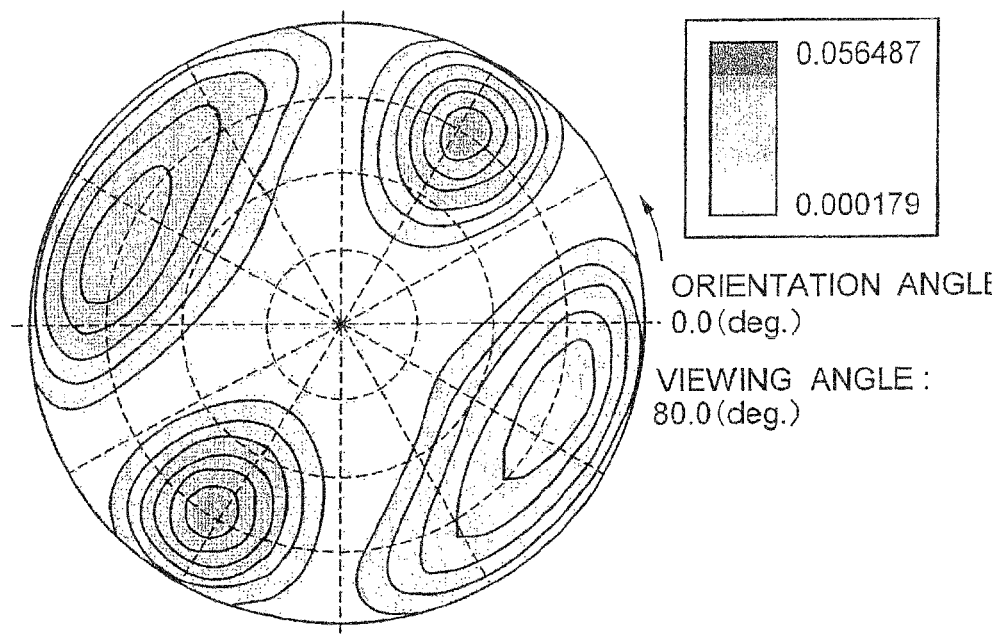
FIGS. 28A and 28B are diagrams showing the viewing angle dependency of the luminance and contrast ratio by using iso-luminance line and iso-contrast line, obtained by simulation in the case of using a single-axial wavelength film.
Figure 28B:
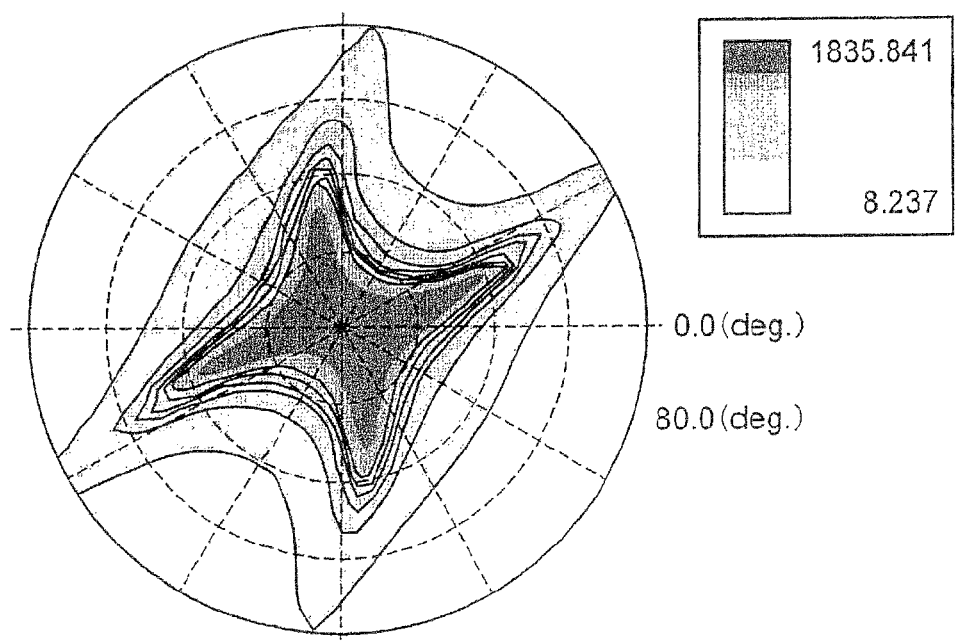

The $\lambda/2$ wavelength films 18, 19 may be configured by a single-axial wavelength film, a biaxial wavelength film, or a combination of layered single-axial wavelength film and a biaxial wavelength film. A simulation was conducted to obtain the viewing angle dependency of the luminance and the contrast ratio during display of a dark state, for the case using a single-axial wavelength film. FIGS. 28A and 28B show the results of simulation. For the case using the single-axial wavelength film, as shown in FIG. 28A, leakage light is noticed as observed from a significant viewing angle in the orientation aligned with the direction of the λ/2 wavelength films 18, 19. This leakage light has an influence on the contrast ratio being considerably reduced depending on the observed direction, as shown in FIG. 28B.

Figure 29A:
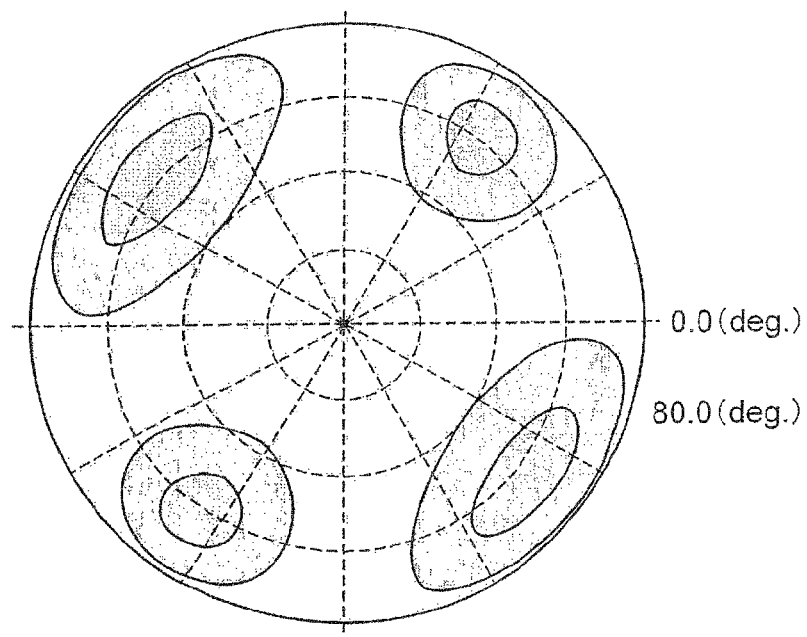
FIGS. 29A and 29B are diagrams showing the viewing angle dependency of the luminance and contrast ratio by using iso-luminance line and iso-contrast line, obtained by simulation in the case of using a combination wavelength film.
Figure 29B:
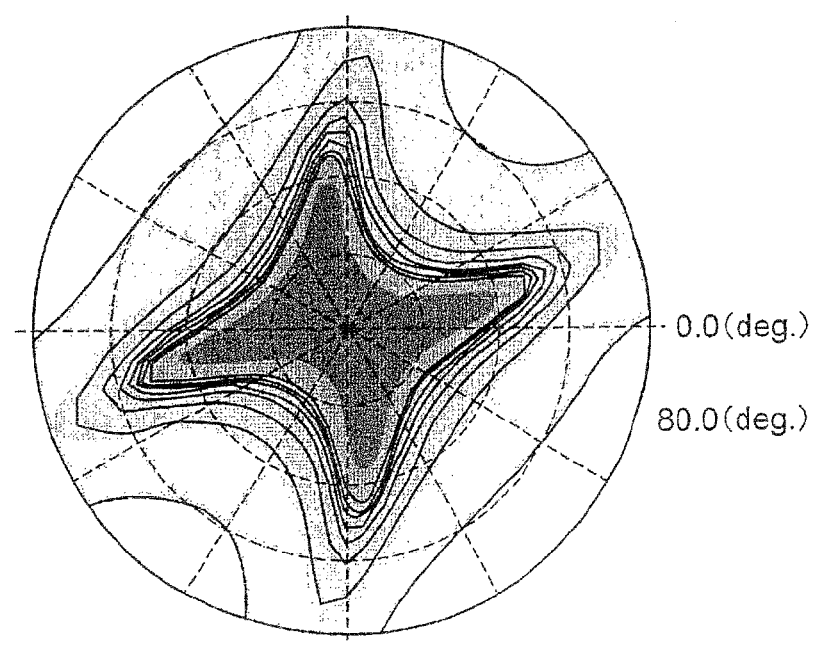

Simulation was conducted for obtaining the viewing angle dependency of the luminance and contrast ratio during display of a dark state for the case using a layered structure including a single-axial λ/2 wavelength film and a biaxial λ/4 wavelength film as the λ/2 wavelength films 18, 19. In each of the λ/2 wavelength films 18, 19, the single-axial wavelength film is disposed near the polarizing film 11, 15 and the biaxial wavelength film is disposed near the LC layer 13 in the simulation. FIGS. 29A and 29B show the result of the simulation for the luminance and the contrast ratio, respectively. The layered structure has the advantage of reduced leakage color as shown in FIG. 29A compared to the case using the single-axial wavelength film shown in FIG. 28A. This improves the viewing angle dependency of the contrast ratio as shown in FIG. 29B.

Figure 30A:
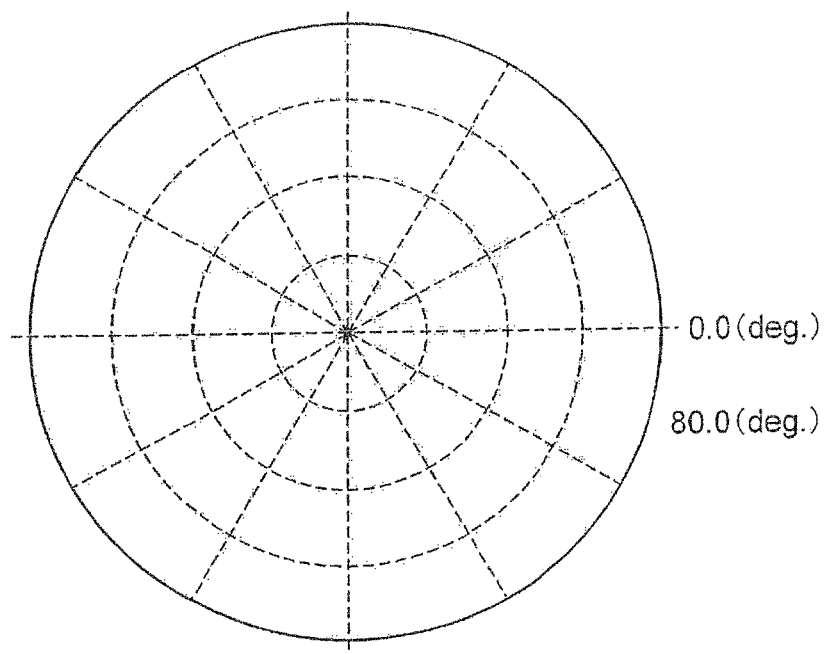
FIGS. 30A and 30B are diagrams showing the viewing angle dependency of the luminance and contrast ratio by using iso-luminance line and iso-contrast line, obtained by simulation in the case of using a biaxial wavelength film.
Figure 30B:
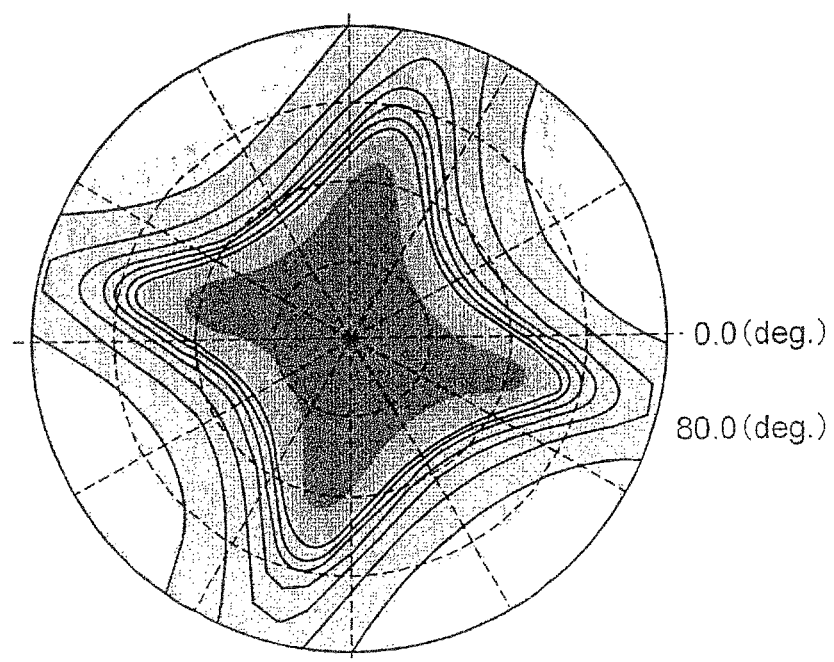

Another simulation was also conducted for obtaining the viewing angle dependency of the luminance and contrast ratio for the case using a biaxial wavelength film. The results are shown in FIGS. 30A and 30B, similarly to FIGS. 23A and 23B. The biaxial wavelength film provides reduced leakage color, as shown in FIG. 30A, compared to the case using the layered structure as shown in FIG. 29A. This also considerably improves the viewing angle dependency of the contrast ratio, as shown in FIG. 30B.

In the present embodiment, use of the λ/2 wavelength films 18, 19 reduces bluish coloring during display of a dark state in the reflective region, thereby improving image quality of the transflective LCD device. In addition, use of the layered structure including a single-axial wavelength film and biaxial wavelength film or a biaxial wavelength film reduces the leakage light in the slanted viewing angle to thereby improved the viewing angle dependency of the luminance and contrast ratio. The other advantages are similar to those achieved in the first embodiment.

Figure 31:
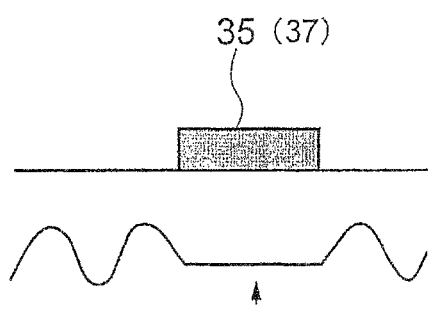
FIG. 31 is a sectional view of a reflective film in the vicinity of the pixel electrode (or common electrode) in the reflective region.

In the first embodiment, a portion of the reflection film is not disposed directly behind the pixel electrode 35 and first common electrode 37. However, the present invention is not limited to this example. The reflection film may be such that shown in FIG. 31, wherein the reflection film 16 has a flat surface directly behind the pixel electrode 35 or first common electrode 37.

Figure 32:
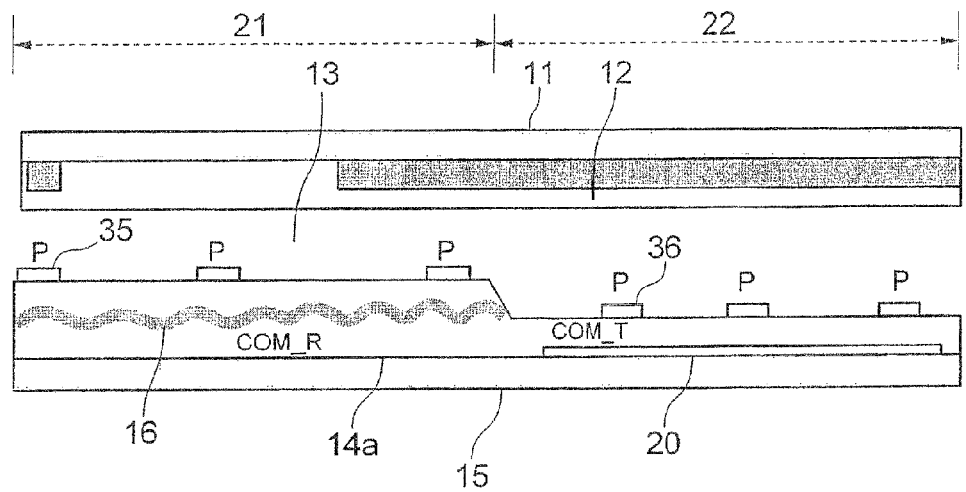
FIG. 32 is a sectional view of a FFS-mode LCD device to which the present invention can be applied in the above embodiments.

In the above embodiments, IPS-mode LCD device is exemplified as the LCD device of the embodiments. The display mode of the LCD device of the first invention, for example, may be a fringe-field-switching(FFS)-mode instead. FIG. 32 shows a sectional view of the FFS-mode LCD device according to a fourth embodiment of the present invention. The LCD device, generally designated by numeral 10d, includes a reflective region 21 and a transmissive region 22. On the TFT substrate 14a, a reflection film 16 and an embedding insulation film are formed in the reflective region 21. The reflection film 16 reflects the light incident from the first polarizing film 11. The reflection film 16 has an uneven surface in general for improving the light dispersion effect; however, a dispersion film may be additionally provided in the counter substrate 12 instead of providing the uneven surface to the reflection film 16. In a further alternative, a dispersion adhesive layer wherein light dispersion beads are dispersed may be provided on the surface of the polarizing film 11 near the counter substrate 12.

Figure 33:
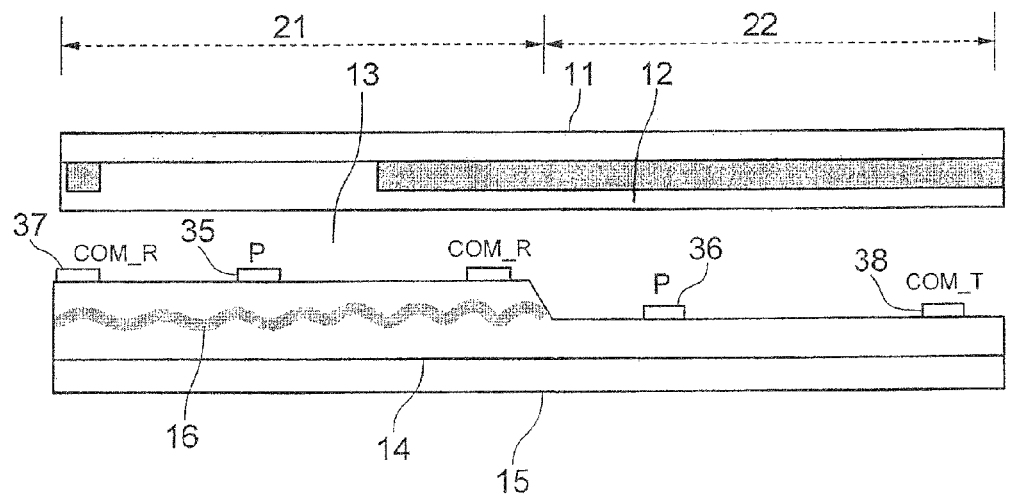
FIG. 33 is a sectional view of the IPS-mode LCD device of the first embodiment.
Figure 34A:
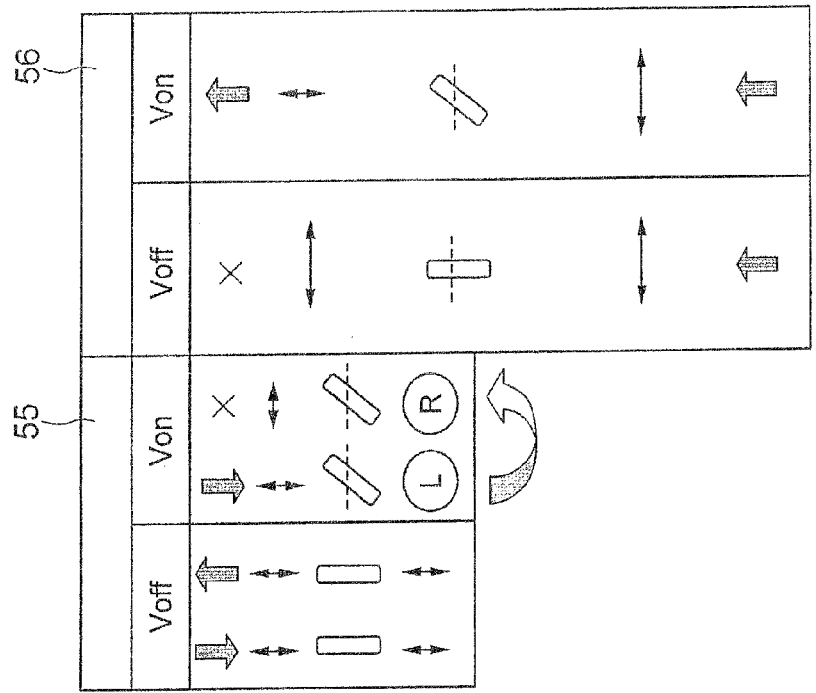
FIG. 34A is a sectional view of a conventional transflective LCD device.
Figure 34B:
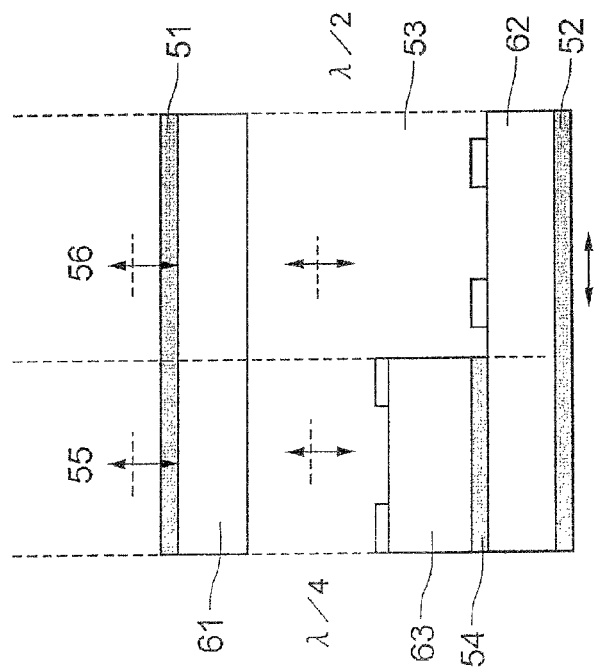
FIG. 34B is a schematic diagram of the LCD device of FIG. 34A.
Figure 35:
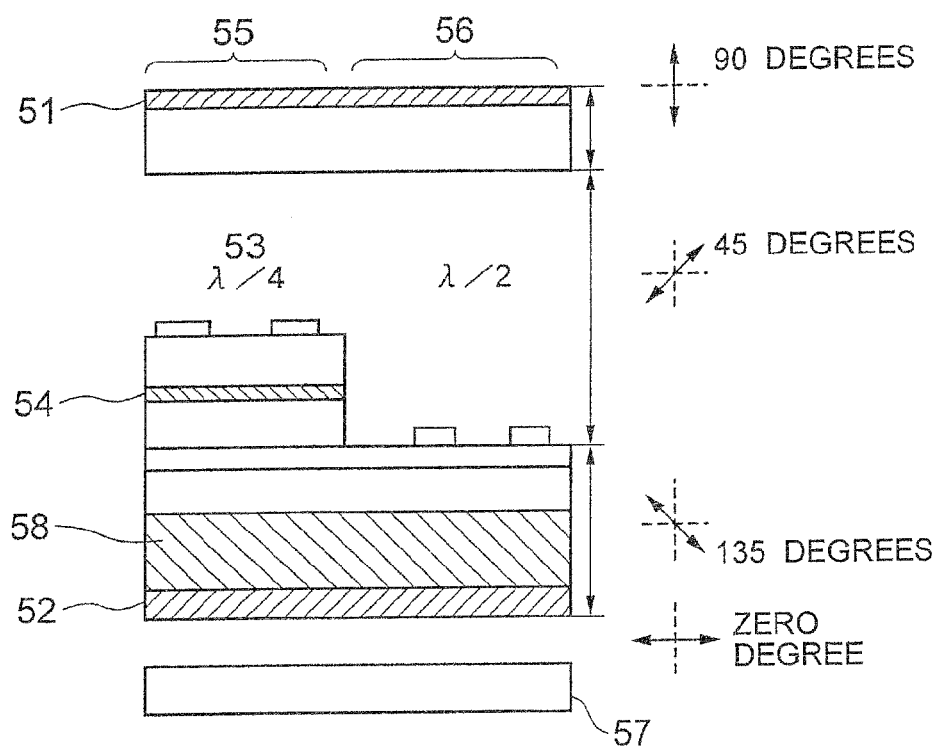
FIG. 35 is a sectional view of another conventional transflective LCD device described in a patent publication

FIG. 33 shows a sectional view of the IPS-mode LCD device 10 of the first embodiment. Comparing the structure of FIG. 32 against the structure of FIG. 33, the FFS-mode LCD device 10d does not include a common electrode 37 juxtaposed with the pixel electrode m35, differently from the IPS-mode LCD device 10. The FFS-mode LCD device 10d includes a reflection film 16 connected to a first common electrode line (not shown) and thus acting as the common electrode 37 in the reflective region 21. In the transmissive region 22 of the FFS-mode LCD device 10d, a transparent common electrode 20 corresponding to the common electrode 38 in the IPS-mode LCD device 10 is provided at the rear side of the pixel electrode 36 in the transmissive region 22. In the FFS-mode LCD device 10d, the pixel electrode 36, underlying common electrode 20 and reflection film 16 generates an electric field therebetween to drive the LC layer 13. The driving operation of the FFS-mode LCD device 10d is similar to that of the IPS-mode LCD device 10 of the present embodiment, and thus omitted here for description thereof.

In the LCD device of the fourth embodiment, the structure similar to that used in the first embodiment is used. The configuration of the third embodiment may be combined with the configuration of the second embodiment. Further, the FFS-mode LCD device may have a structure similar to the structure of the first through fourth embodiments.

In accordance with the transflective LCD device of the embodiment of the first aspect of the present invention, the reflective region and the transmissive region of the LC layers are applied with different electric fields so that both the regions represent similar gray-scale levels irrespective of operating in the different normal modes, thereby solving the image-inversion problem encountered in the conventional transflective LCD device.

It is preferable that the first common signal and the second common signal be inverted in synchrony with the pixel signal, and the first common signal be substantially an inverted signal of the second common signal. For example, if the pixel electrode in both the reflective and transmissive regions is applied with 5 volts, the first common electrode is applied with a first common signal of zero volt, and the second common electrode is applied with 5 volts. This allows the LC molecules only in the reflective region are rotated, whereby the image-inversion problem can be solved. It is to be noted that the first common signal need not be a strict inverted signal of the second common signal. For example, if the first common signal assumes zero volt or 5 volts, the second common signal may assume 6 volts or zero volt.

It is also preferable that the pixel electrode include a first pixel electrode in the reflective region and a second pixel electrode in the transmissive region, and each of the pixels be associated with a first switching device for coupling a data line to the first pixel electrode, and a second switching device for coupling the data line to the second pixel electrode. A concurrent turn-ON of the first and second switching devices allows the common pixel signal to be supplied to both the reflective region and the transmissive region. After the supply of the common data signal, the first and second switching devices are turned OFF, to allow the first and second pixel electrode to assume different potentials.

It is also preferable that the reflective region includes therein a reflection film having a potential substantially equal to a median between a potential of the first pixel electrode and a potential of the first common electrode. This suppresses an excessive electric field from being applied between the reflective film and the pixel electrode or the first common electrode, to reduce leakage light during display of a dark state.

The potential of the reflection film may be determined by a capacitive coupling between the same and the first pixel electrode and a capacitive coupling between the same and the first common electrode. In an alternative, the potential of the reflection film may be determined by a potential setting circuit.

It is also preferable that a portion of the reflection film is omitted in an area directly behind the first pixel electrode and the first common electrode. In an IPS-mode LCD device, the reflection film may generate leakage light; however, this configuration reduces the luminance directly behind the electrode and thus reduces the leakage light.

In an alternative, a portion of the reflection film in an area directly behind the first pixel electrode and the first common electrode may have a flat surface, and the other portion of the reflection film may have an uneven surface. By suppressing the light dispersion, the luminance of the area directly behind the electrode can be reduced, whereby the leakage light is reduced.

In accordance with the transflective LC device of the embodiment of the second aspect of the present invention, the first and second switching devices write data into the first pixel electrode in the reflective region and the second pixel electrode in the transmissive region, respectively. The first and second switching devices may write the same data concurrently or separately in a time-division scheme into both the regions, while the common electrode in the respective regions has different potential. This allows the LC layer in the different regions to be applied with different electric fields so that the image-inversion problem can be solved.

In the second aspect of the present invention, at least one of the reflective region and the transmissive region may be driven by a lateral electric field.

The at least one of the reflective region and the transmissive region may be driven in an in-plane-switching mode.

It is preferable in the second aspect of the present invention that each of the pixels include a first common electrode in the reflective region and a second common electrode in the transmissive region, and the reflective region include therein a reflection film having a potential substantially equal to a median between a potential of the first pixel electrode and a potential of the common electrode.

The potential of the reflection film may be determined by a capacitive coupling between the same and the first pixel electrode and a capacitive coupling between the same and the first common electrode. The potential of the reflection film maybe determined by a potential setting circuit instead.

It is preferable that a portion of the reflection film be omitted in an area directly behind the first pixel electrode and the first common electrode.

In an alternative, a portion of the reflection film in an area directly behind the first pixel electrode and the first common electrode may have a flat surface, and the other portion of the reflection film may have an uneven surface.

In the transflective LCD device of the second aspect of the present invention, at least one of the reflective region and the transmissive region of the LC layer may be driven in a FFS mode as well as in an IPS mode. In the FFS-mode LCD device, each of the pixels may include a first common electrode in the reflective region and a second common electrode in the transmissive region, and the reflective region may include a reflection film applied with a potential equal to a potential of the second common electrode.

In the transflective LCD device of the second aspect of the present invention, the reflective region and the transmissive region may be driven in a normally-white mode and a normally-black mode, respectively. In this case, the LC layer should be applied with different electric fields in the reflective region and transmissive region by, for example, applying no electric field in the reflective region and a specific electric field in the transmissive region for display of a dark state in both the regions.

In the LCD device of the second aspect of the present invention, each of the pixels may include a first common electrode receiving a first common electrode signal common among the reflective regions of a plurality of the pixels, and a second common electrode receiving a second common signal which is common among the transmissive regions of the plurality of the pixels. In this case, the first pixel electrode and second pixel electrode may receive the same data signal for display of similar gray-scale levels.

The first common signal may be is substantially an inverted signal of the second common signal. For example, if the first and second common signals each are to assume a suitable voltage between zero volt and 5 volts, the second common signal may assume 5 volts when the first common signal assumes zero volt.

The first and second switching devices may be turned ON in a time-division scheme, and the first pixel electrode may receive a first pixel signal for driving the reflective region of the LC layer in a normally-white mode, and the second pixel electrode may receive a second pixel signal for driving the transmissive region of the LC layer in a normally-black mode. In this case, the data lines may be common to the first pixel electrode and second pixel electrode to apply different voltages thereto.

At least one of the first pixel signal and the second pixel signal may be created by a data converter including a line memory and a gray-scale level converter including a look-up table tabulating gray-scale level data. The external data is stored in the line memory and can be used as it is for the reflective region, for example, and can be used for the transmissive region after conversion using the look-up table. The look-up table may be replaced by a gray-scale level converter configured by a logic circuit.

In the above case, the first and second switching devices may be turned ON in a time-division scheme, the first pixel electrode and the second pixel electrode may receive a common pixel signal, and each of the pixels may include a common electrode for receiving different common electrode signals during a first timing when the first electrode signal receives the common pixel signal and a second timing when the second electrode receives the common pixel signal. The present invention can be applied to the IPS-mode LCD device, FFS-mode LCD device and VA-mode LCD device.

Since the above embodiments are described only for examples, the present invention is not limited to the above embodiments and various modifications or alterations can be easily made therefrom by those skilled in the art without departing from the scope of the present invention.

What is claimed is:

1. A transflective liquid crystal display (LCD) device comprising first and second polarizing films having polarizing axes perpendicular to one another, a liquid crystal (LC) layer interposed between said first polarizing film and said second polarizing film, said LC layer defining an array of pixels each including a reflective region and a transmissive region juxtaposed, wherein:

LC molecules of said LC layer have a longer axis extending parallel to or normal to the polarization direction of the light incident onto said LC layer in said reflective region; and each of said pixels includes a pixel electrode receiving a pixel signal which is common between said reflective region and said transmissive region, a first common electrode, formed in said reflective region, receiving a first common signal which is common among said reflective regions of a plurality of said pixels, and a second common electrode, formed in said transmissive region, receiving a second common signal which is common among said transmissive regions of said plurality of said pixels, wherein said pixel electrode includes a first pixel electrode formed in said reflective region and a second pixel electrode formed in said transmissive region, and each of said pixels is associated with a first switching device for coupling a data line to said first pixel electrode, and a second switching device for coupling said data line to said second pixel electrode, and wherein said reflective region includes therein a reflection film having a potential substantially equal to a median between a potential of said first pixel electrode and a potential of said first common electrode.

2. The LCD device according to claim 1, wherein a first interconnect applied with the equi-potential with said first pixel electrode and a second interconnect applied with the equi-potential with said first common electrode are provided on the rear side of said reflection film, wherein said potential of said reflection film is determined by a capacitive coupling between said first common electrode and said first pixel electrode.

3. The LCD device according to claim 1, wherein said potential of said reflection film is determined by a potential setting circuit, wherein said potential is applied directly to said reflection film through the potential setting circuit.

4. The LCD device according to claim 1, wherein a portion of said reflection film is omitted in an area directly behind said first pixel electrode and said first common electrode.

5. The LCD device according to claim 1, wherein a portion of said reflection film in an area directly behind said first pixel electrode and said first common electrode has a flat surface, and another portion of said reflection film has an uneven surface.

6. A transflective liquid crystal display (LCD) device comprising a liquid crystal (LC) layer defining an array of pixels arranged in a matrix, each of said pixels including therein a reflective region and a transmissive region juxtaposed, wherein:

each of said pixels includes a first pixel electrode formed in said reflective region, and a second pixel electrode formed in said transmissive region; and each of said pixels is associated with a first switching device for coupling said first electrode to a data line supplying a data signal, and a second switching device for coupling said second electrode and said data line, each of said pixels including a first common electrode formed in said reflective region, said first common electrode connected in common with common electrodes disposed in said reflective regions of a plurality of said pixels, and a second common electrode formed in said transmissive region, said second common electrode connected in common with common electrodes disposed in said transmissive regions of a plurality of said pixels, wherein said first and second switching devices are connected to a common data line.

* * * * *